US012800793B2

(12) United States Patent
Imai et al.

(10) Patent No.: US 12,800,793 B2
(45) Date of Patent: Nov. 17, 2026

(54) MANUFACTURING METHOD OF OPTICAL WAVEGUIDE

(71) Applicant: SUMITOMO BAKELITE CO., LTD., Tokyo (JP)

(72) Inventors: Hirotake Imai, Tokyo (JP); Motoya Kaneta, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 50 days.

(21) Appl. No.: 18/681,523

(22) PCT Filed: Oct. 20, 2022

(86) PCT No.: PCT/JP2022/039043
§ 371 (c)(1),
(2) Date: Feb. 6, 2024

(87) PCT Pub. No.: WO2023/074516
PCT Pub. Date: May 4, 2023

(65) Prior Publication Data

US 2025/0004174 A1 Jan. 2, 2025

(30) Foreign Application Priority Data

Oct. 28, 2021 (JP) ................................ 2021-176253

(51) Int. Cl.
*G02B 1/04* (2006.01)
*G02B 6/02* (2006.01)

(52) U.S. Cl.
CPC ............... *G02B 1/046* (2013.01); *G02B 6/02* (2013.01)

(58) Field of Classification Search
None
See application file for complete search history.

(56) References Cited

U.S. PATENT DOCUMENTS

2003/0038251 A1 2/2003 Livesay et al.
2009/0080830 A1 3/2009 Matsuoka et al.
(Continued)

FOREIGN PATENT DOCUMENTS

EP 1512996 3/2005
JP 2003-344684 12/2003
(Continued)

OTHER PUBLICATIONS

International Search Report and Written Opinion for International Application No. PCT/JP2022/039043 mailed on Jan. 10, 2023, 9 pages.

*Primary Examiner* — Alexander M Weddle
(74) *Attorney, Agent, or Firm* — Amin, Turocy & Watson, LLP

(57) ABSTRACT

The manufacturing method of an optical waveguide of the present invention includes a step of preparing a pre-exposure laminate including a substrate and a core forming layer laminated on the substrate, a step of irradiating the core forming layer with active radiation to obtain a post-exposure laminate which has a core layer including a core portion corresponding to a non-irradiated region with the active radiation and a side cladding portion corresponding to an irradiated region with the active radiation, and has the substrate supporting the core layer, a step of laminating a cladding layer on the core layer included in the post-exposure laminate to obtain a workpiece, and a step of cutting out an optical waveguide from the workpiece, in which the irradiated region includes a frame-shaped part extending along an outer edge of the core forming layer and having a frame shape, and an area of the irradiated region is 20% or more of an entire area of the core forming layer.

9 Claims, 17 Drawing Sheets

(56) References Cited

U.S. PATENT DOCUMENTS

| | | | | |
|---|---|---|---|---|
| 2011/0110623 | A1 | 5/2011 | Terada et al. | |
| 2013/0170803 | A1* | 7/2013 | Mori | G02B 6/138<br>385/124 |
| 2013/0298295 | A1 | 11/2013 | Falgayrettes et al. | |
| 2020/0292753 | A1 | 9/2020 | Maeda et al. | |

FOREIGN PATENT DOCUMENTS

| | | | | | |
|---|---|---|---|---|---|
| JP | 2011-053483 | | | 3/2011 | |
| JP | 2018-084695 | | | 5/2018 | |
| JP | 2018084695 | A | * | 5/2018 | |
| JP | 2018-141910 | | | 9/2018 | |
| JP | 2019-028116 | | | 2/2019 | |
| JP | 2019028115 | A | * | 2/2019 | |
| TW | 201502059 | | | 1/2015 | |
| WO | 2006/054569 | | | 5/2006 | |
| WO | WO-2006075849 | A1 | * | 7/2006 | G02B 6/24 |
| WO | 2009/154206 | | | 12/2009 | |
| WO | 2012/081375 | | | 6/2012 | |
| WO | WO-2012081375 | A1 | * | 6/2012 | G02B 6/138 |
| WO | 2014/204458 | | | 12/2014 | |
| WO | 2019/093460 | | | 5/2019 | |
| WO | 2019/154206 | | | 8/2019 | |

* cited by examiner

IRRADIATED REGION WITH ULTRAVIOLET RAYS IN CASE OF PRODUCING TEST PIECE E1 (AREA RATIO: 20%)

IRRADIATED REGION WITH ULTRAVIOLET RAYS IN CASE OF PRODUCING TEST PIECE E1 (AREA RATIO: 95%)

IRRADIATED REGION WITH ULTRAVIOLET RAYS IN CASE OF PRODUCING TEST PIECE E2

IRRADIATED REGION WITH ULTRAVIOLET RAYS IN CASE OF PRODUCING TEST PIECE E3

MANUFACTURING METHOD OF OPTICAL WAVEGUIDE

TECHNICAL FIELD

The present invention relates to a manufacturing method of an optical waveguide.

BACKGROUND ART

PTL 1 discloses a manufacturing method of an optical waveguide including a core layer and a first cladding layer and a second cladding layer which are arranged to sandwich the core layer. The manufacturing method specifically includes a step of laminating the first cladding layer on the core layer laminated on a substrate, a step of removing the substrate from the core layer, and a step of laminating the second cladding layer on a surface of the core layer from which the substrate has been removed.

In addition, PTL 1 discloses that the core layer is manufactured through a step of forming a core-forming film by a coating method and a step of selectively irradiating the core-forming film with ultraviolet rays, and then heating the core-forming film in an oven to cure the core-forming film.

CITATION LIST

Patent Literature

[PTL 1] PCT International Publication No. WO2012/081375

SUMMARY OF INVENTION

Technical Problem

As a result of intensive studies by the present inventors, it has been found that an amount of deformation (amount of warpage) of the core layer changes depending on a size of a non-irradiated region. As the amount of warpage of the core layer increases, implementation of the step of laminating the first cladding layer on the core layer, the step of removing the substrate from the core layer, and the like are hindered. Therefore, in order to increase manufacturing efficiency of the optical waveguide, it is required to suppress the amount of warpage of the core layer.

An object of the present invention is to provide a manufacturing method of an optical waveguide, which suppresses deformation such as warpage of a post-exposure laminate by irradiation with active radiation and can improve manufacturing efficiency.

Solution to Problem

Such an object is achieved by the present invention of the following (1) to (6).

(1) A manufacturing method of an optical waveguide, including:

a step of preparing a pre-exposure laminate including a substrate and a core forming layer laminated on the substrate;

a step of irradiating the core forming layer with active radiation to obtain a post-exposure laminate which has a core layer including a core portion corresponding to a non-irradiated region with the active radiation and a side cladding portion corresponding to an irradiated region with the active radiation, and has the substrate supporting the core layer;

a step of laminating a cladding layer on the core layer included in the post-exposure laminate to obtain a workpiece; and a step of cutting out an optical waveguide from the workpiece, in which the irradiated region includes a frame-shaped part extending along an outer edge of the core forming layer and forming a frame shape, and an area of the irradiated region is 20% or more of an entire area of the core forming layer.

(2) The manufacturing method of an optical waveguide according to (1), in which the core forming layer contains a polymer and a monomer, and the monomer moves by the irradiation with active radiation to cause a difference in refractive index between the irradiated region and the non-irradiated region.

(3) The manufacturing method of an optical waveguide according to (1) or (2), in which a film thickness of the cladding layer is 1 to 200 μm.

(4) The manufacturing method of an optical waveguide according to any one of (1) to (3), in which the workpiece includes the core layer and two cladding layers laminated through the core layer, and the step of obtaining the workpiece includes an operation of laminating the cladding layer on the core layer included in the post-exposure laminate to obtain a first laminate, an operation of peeling off the substrate from the first laminate to obtain a remainder as a second laminate, and an operation of laminating the cladding layer on the core layer included in the second laminate to obtain the workpiece.

(5) The manufacturing method of an optical waveguide according to (4), in which the workpiece further includes a first cover layer and a second cover layer laminated to sandwich the core layer and the two cladding layers.

(6) The manufacturing method of an optical waveguide according to any one of (1) to (5), in which a film thickness of the workpiece is 50 to 300 μm.

Advantageous Effects of Invention

According to the present invention, it is possible to efficiently manufacture an optical waveguide which suppresses deformation such as warpage of a post-exposure laminate by irradiation with active radiation.

DESCRIPTION OF EMBODIMENTS

Hereinafter, the manufacturing method of an optical waveguide according to the present invention will be described in detail based on suitable embodiments shown in the accompanying drawings.

Figure 1:
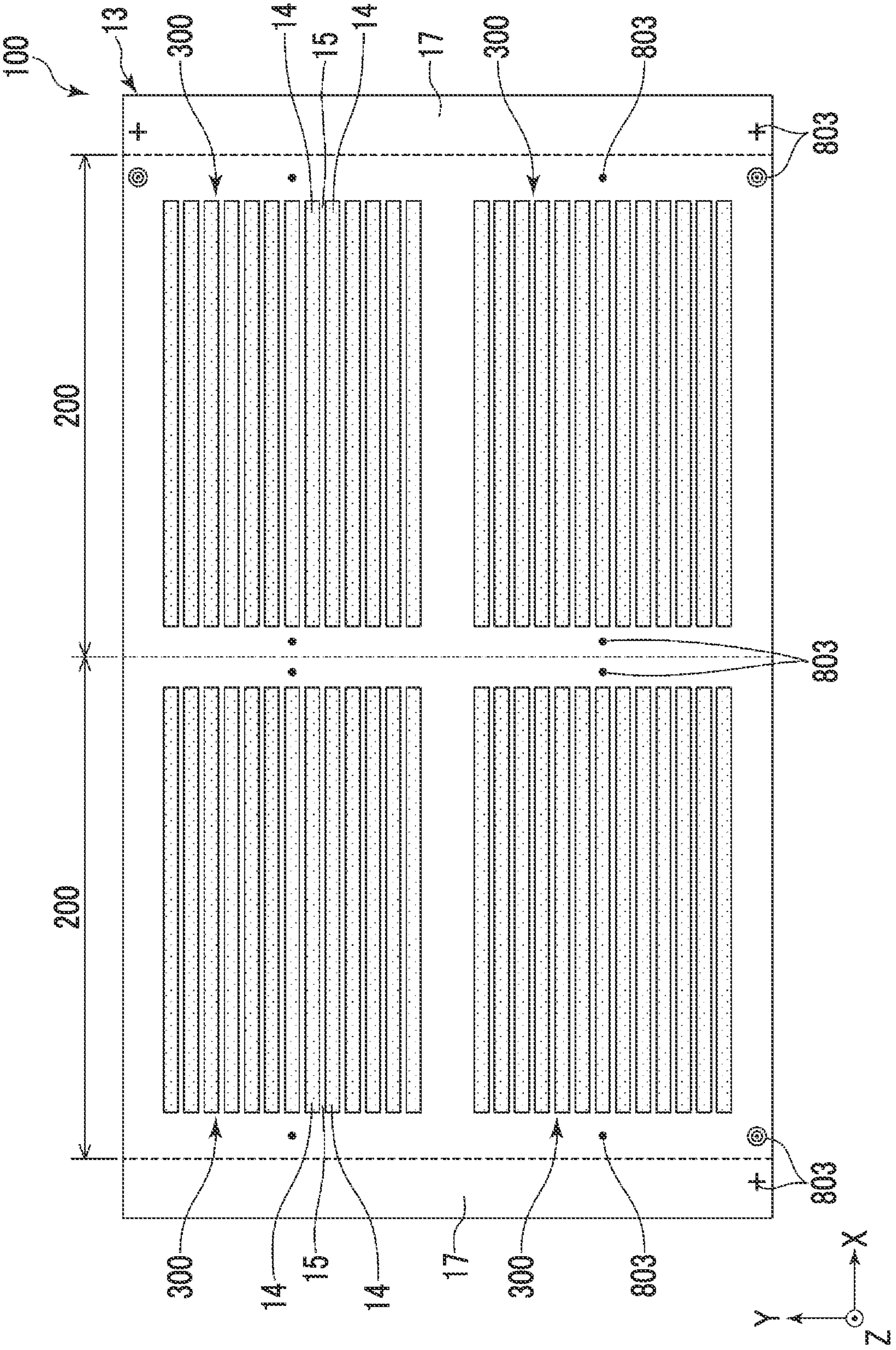
FIG. 1 is a plan view showing a workpiece used in the manufacturing method of an optical waveguide according to an embodiment.
Figure 2:
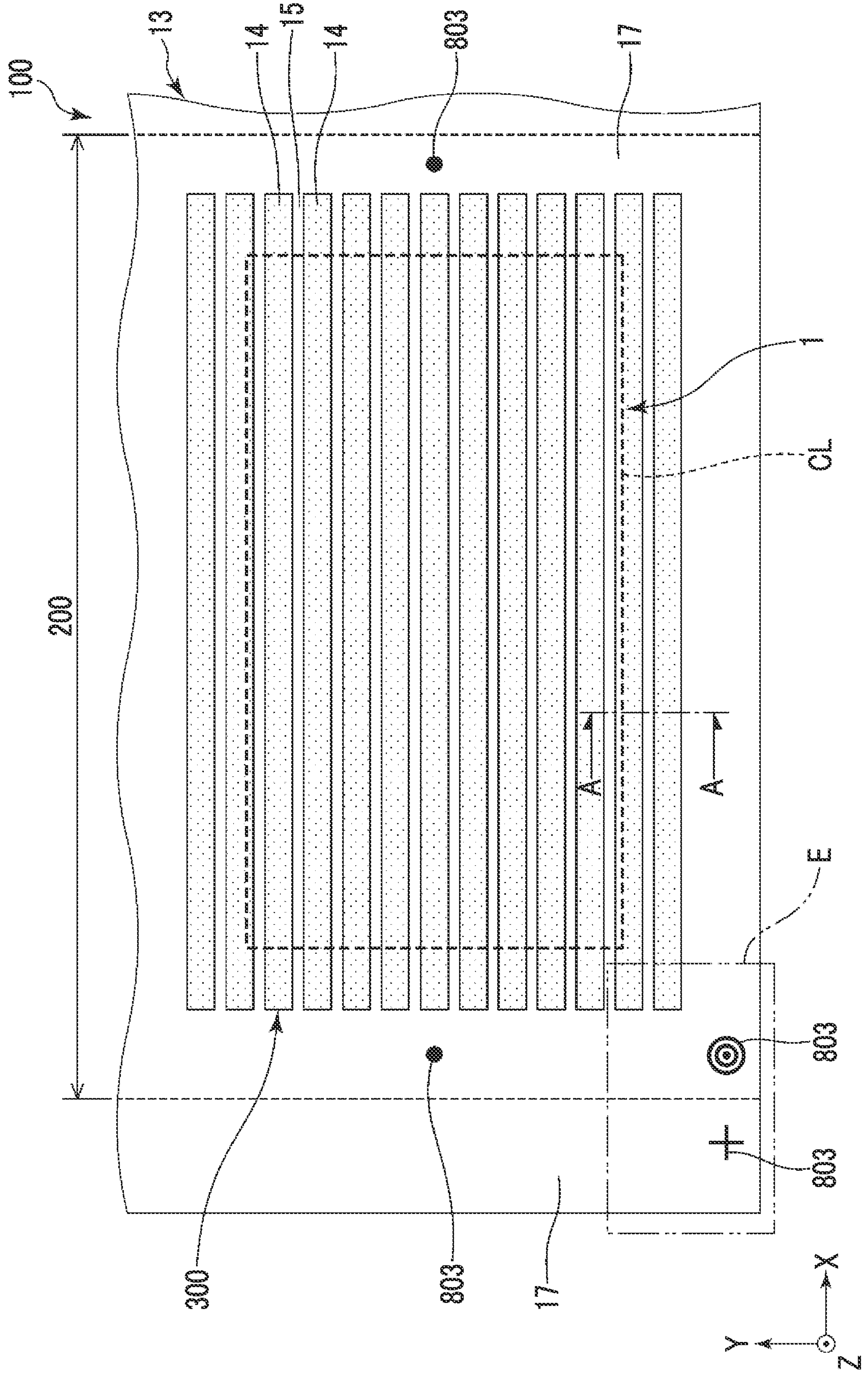
FIG. 2 is a partially enlarged view of FIG. 1.
Figure 3:
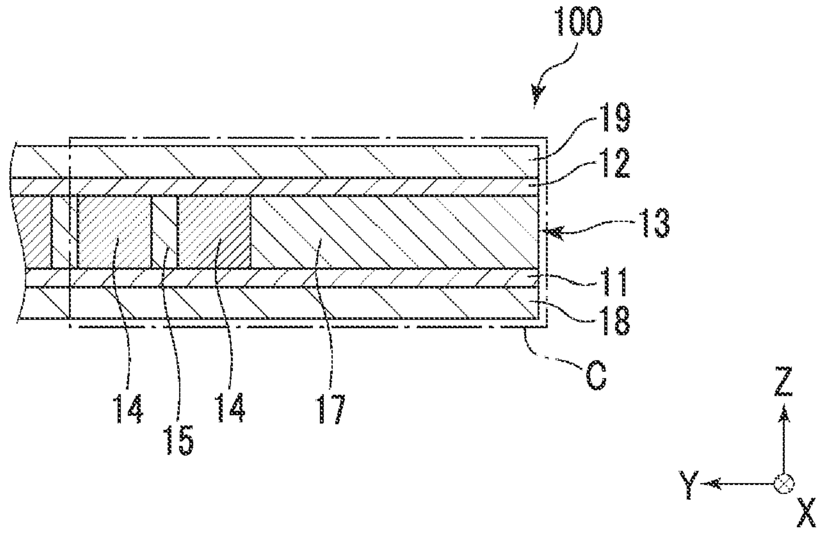
FIG. 3 is a cross-sectional view taken along a line A-A of FIG. 2.

FIG. 1 is a plan view showing a workpiece used in the manufacturing method of an optical waveguide according to the embodiment. FIG. 2 is a partially enlarged view of FIG. 1. FIG. 3 is a cross-sectional view taken along a line A-A of FIG. 2.

In each of the drawings of the present application, the X-axis, the Y-axis, and the Z-axis are set as three axes orthogonal to each other, and are indicated by arrows. In addition, a tip end side of the arrow is referred to as "plus side", and a base end side thereof is referred to as "minus side". Furthermore, a tip end side of an arrow representing the Z-axis is referred to as "up", and a base end side thereof is referred to as "down".

1. WORKPIECE

A workpiece 100 shown in FIG. 1 is a member used for manufacturing an optical waveguide 1 shown in FIG. 2, has a sheet shape, and has two units 200. Each unit 200 has two pieces 300. One optical waveguide 1 can be cut out from the piece 300. Therefore, the workpiece 100 is a member from which four optical waveguides 1 can be manufactured at one time. The number of optical waveguides 1 which can be manufactured at one time is not particularly limited as long as it is one or more. In addition, the number of units 200 is not limited.

1.1. Structure

FIG. 2 is an enlarged view of a vicinity of one piece 300 in the workpiece 100.

As shown in FIG. 2, the piece 300 has thirteen core portions 14 and twelve first side cladding portions 15. Each of the portions has a long shape, extends along the X-axis, and is arranged along the Y-axis. The number of core portions 14 included in the piece 300 is not particularly limited, and may be one or more.

The first side cladding portion 15 is adjacent to at least one of the core portions 14 in the Y-axis direction. Therefore, the first side cladding portion 15 is disposed between the core portions 14. In addition, a second side cladding portion 17 having a frame shape is provided to surround these portions. In the following description, both the first side cladding portion 15 and the second side cladding portion 17 may be simply referred to as "side cladding portion".

An optical signal is incident on the core portion 14, and the optical signal is transmitted along the Y-axis. Accordingly, optical communication can be performed through the core portion 14. The optical waveguide 1 may be used for illumination. In addition, the optical waveguide 1 may be used for allowing the optical signal to be incident on a part of the plurality of core portions 14 and for preventing the optical signal from being incident on the other parts. Accordingly, the core portion 14 of the other parts functions as a dummy, and the transmission efficiency of the core portion 14 of a part can be increased.

As shown in FIG. 3, the workpiece 100 has a laminated structure in which a first cover layer 18, a first cladding layer 11, a core layer 13, a second cladding layer 12, and a second cover layer 19 are laminated in this order. Each layer of the laminated structure extends along an X-Y plane. The workpiece 100 is a resin film and has flexibility. FIGS. 1 and 2 are plan views of the workpiece 100 as viewed from above, and are views in which the core layer 13 is seen through the second cover layer 19 and the second cladding layer 12. One of the first cladding layer 11 and the second cladding layer 12 may be omitted. In addition, any one of the first cover layer 18 or the second cover layer 19 may be omitted. Furthermore, each of the first cladding layer 11 and the first cover layer 18, and each of the second cladding layer 12 and the second cover layer 19 may be provided with an optional intermediate layer.

The core portion 14, first side cladding portion 15, and second side cladding portion 17 described above are provided in the core layer 13. Therefore, the core portion 14 is surrounded by the first side cladding portion 15, the second side cladding portion 17, the first cladding layer 11, and the second cladding layer 12, and light can be confined inside the core portion.

The core portion 14 and the side cladding portion in the core layer 13 are formed based on a difference in refractive index of constituent materials. For example, the refractive index distribution can be formed in the core layer 13 by making the constituent materials of the core portion 14 and the side cladding portion different from each other. In addition, as a constituent material of the core layer 13, a method of using a polymer having a detachable group (a detachable pendant group) which is branched from a main chain and in which at least a part of a molecular structure thereof can be detached from the main chain by irradiation with active radiation can be used. In such a method, since the refractive index of the polymer is reduced by the detachment of the detachable group, the polymer can form a difference in refractive index depending on whether or not the polymer is irradiated with active radiation, and can form the refractive index distribution in the core layer 13. There are various methods as a method for forming the refractive index distribution in the core layer 13, but in the present embodiment, the core layer 13 contains a polymer and a monomer, and has a refractive index distribution based on a difference in concentration of the monomer or a difference in concentration of a structure derived from the monomer.

The refractive index distribution means that there are a portion having a high refractive index and a portion having a low refractive index. In the present embodiment, the refractive index of the polymer is different from the refractive index of the monomer or the refractive index of the structure derived from the monomer. In the present embodiment, the latter refractive index is lower than the former refractive index. Therefore, the refractive index distribution is formed in association with a difference in concentration. The core portion 14, the first side cladding portion 15, and the second side cladding portion 17 are formed in the core layer 13 in correspondence with the refractive index distribution.

Widths of the core portions 14 in the Y-axis direction may be the same or different from each other. In addition, the width of the core portion 14 in the Y-axis direction and the width of the first side cladding portion 15 may be the same or different from each other.

Furthermore, the core portion 14 may branch in the middle or may intersect with another core portion 14 in the middle.

The total length of the workpiece 100 in the X-axis direction is not particularly limited, but is preferably approximately 100 to 3000 mm and more preferably approximately 500 to 2000 mm. The total width of the workpiece 100 in the Y-axis direction is also not particularly limited, but is preferably approximately 10 to 500 mm and more preferably approximately 50 to 200 mm.

A film thickness of the core layer 13 in the Z-axis direction is not particularly limited, but is preferably approximately 1 to 200 μm, more preferably approximately 5 to 100 μm, and still more preferably approximately 10 to 70 μm. Accordingly, optical characteristics and mechanical strength required for the core layer 13 are ensured.

Film thicknesses of the first cladding layer 11 and the second cladding layer 12, which are the cladding layer, in the Z-axis direction are each preferably approximately 1 to 200 μm, more preferably approximately 3 to 100 μm, and still more preferably approximately 5 to 50 μm. As a result, a sufficient film thickness is secured for the first cladding layer 11 and the second cladding layer 12, and optical characteristics and mechanical strength required for the first cladding layer 11 and the second cladding layer 12 are secured. In addition, in a case where the first cladding layer 11 and the second cladding layer 12 are manufactured, it is possible to suppress a curing shrinkage amount from to be too large.

The first cover layer 18 is laminated on a lower surface of the first cladding layer 11. The second cover layer 19 is laminated on an upper surface of the second cladding layer 12. Accordingly, it is possible to improve mechanical characteristics and durability of the workpiece 100.

A film thickness of the workpiece 100 in the Z-axis direction is preferably 50 to 300 μm, more preferably 60 to 200 μm, and still more preferably 70 to 150 μm. Accordingly, it is possible to sufficiently secure the mechanical strength of the workpiece 100 while increasing the flexibility of the workpiece 100. In addition, since the workpiece 100 has an appropriate thickness, the workpiece 100 can be easily and efficiently manufactured.

1.2. Area Occupied by Side Cladding Portion

In the workpiece 100, an area occupied by the side cladding portion (the first side cladding portion 15 and the second side cladding portion 17) is 20% or more of the entire area of the core layer 13. As will be described in the manufacturing method later, a volume change of the side cladding portion in the manufacturing process is smaller than that of the core portion 14. Therefore, by manufacturing the workpiece 100 such that the proportion of the area occupied by the side cladding portion with respect to the entire area of the core layer 13, that is, the area ratio of the side cladding portion is within the above-described range, a workpiece 100 with little deformation (warpage) can be manufactured. As a result, in a case where the optical waveguide 1 is manufactured from the workpiece 100, it is possible to suppress a decrease in manufacturing efficiency due to the deformation of the workpiece 100.

1.3. Optical Waveguide

Figure 4:
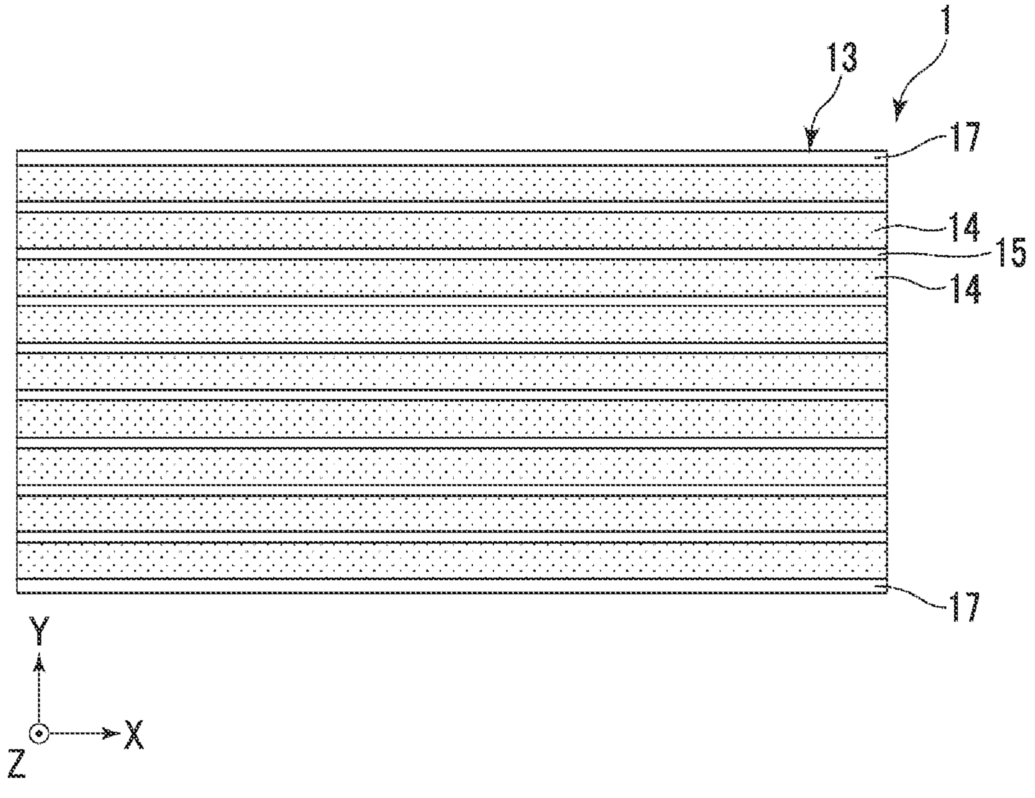
FIG. 4 is a plan view showing an example of an optical waveguide cut out from the workpiece shown in FIG. 2.

FIG. 4 is a plan view showing an example of the optical waveguide 1 cut out from the workpiece 100 shown in FIG. 2.

The optical waveguide 1 shown in FIG. 4 has nine core portions 14, eight first side cladding portions 15, and two second side cladding portions 17. Such an optical waveguide 1 is connected to, for example, another optical component and is used for constructing an optical wiring.

An optical connector (ferrule) (not shown) may be mounted on at least one of both end portions of the optical waveguide 1. The optical waveguide 1 and another optical component can be fixed and optically connected to each other through the optical connector. In addition, the optical waveguide 1 may have a mirror which converts an optical path of light passing through the core portion 14. By converting the optical path through the mirror, the core portion 14 and the optical component provided outside the optical waveguide 1 can be optically connected. A bent waveguide may be used instead of the mirror.

2. PROBLEMS TO BE SOLVED BY PRESENT EMBODIMENT

Next, the problems to be solved by the present embodiment will be described by describing a manufacturing method of an optical waveguide according to a comparative example.

Figure 5:
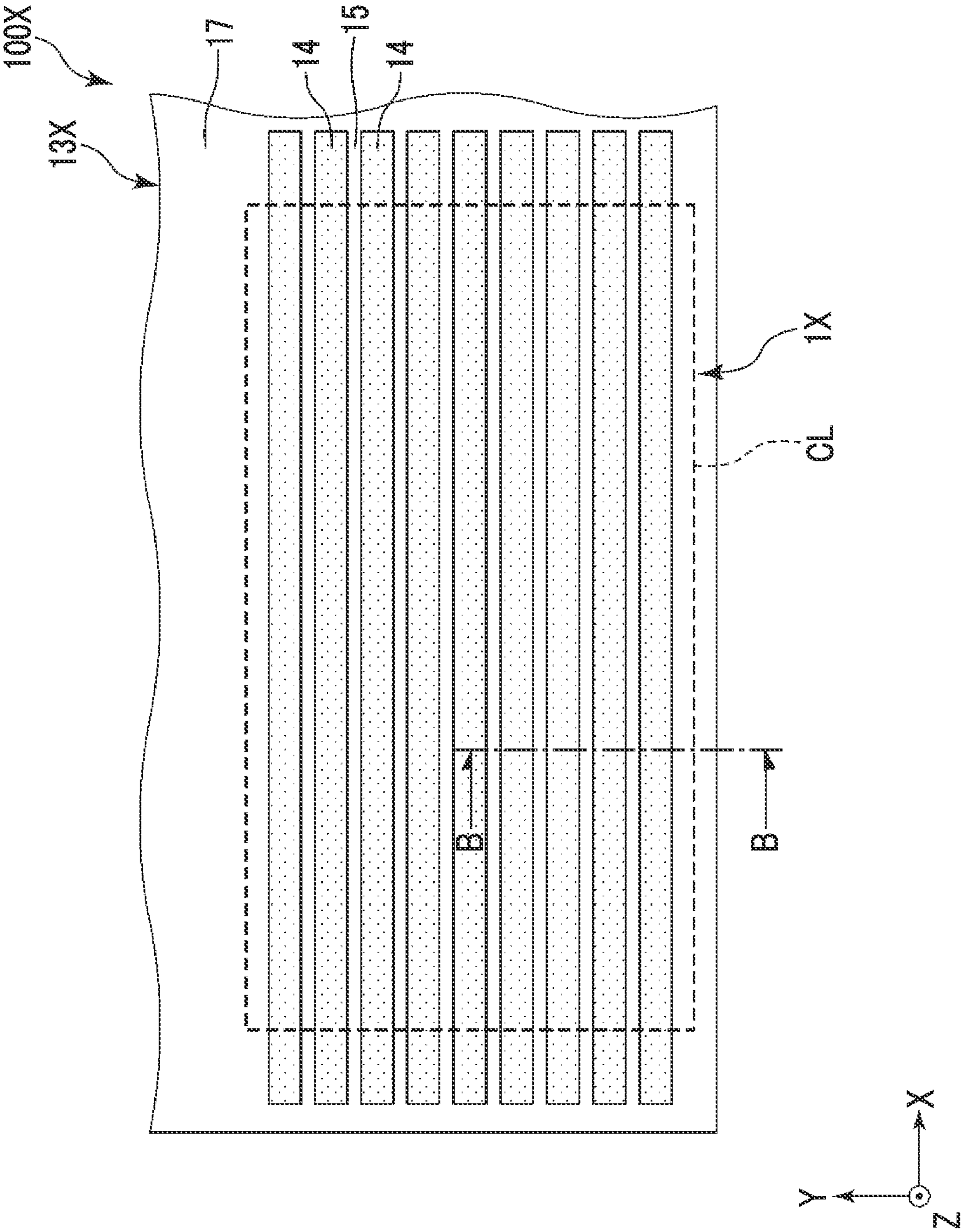
FIG. 5 is a plan view for explaining a manufacturing method of an optical waveguide according to a comparative example.
Figure 6:
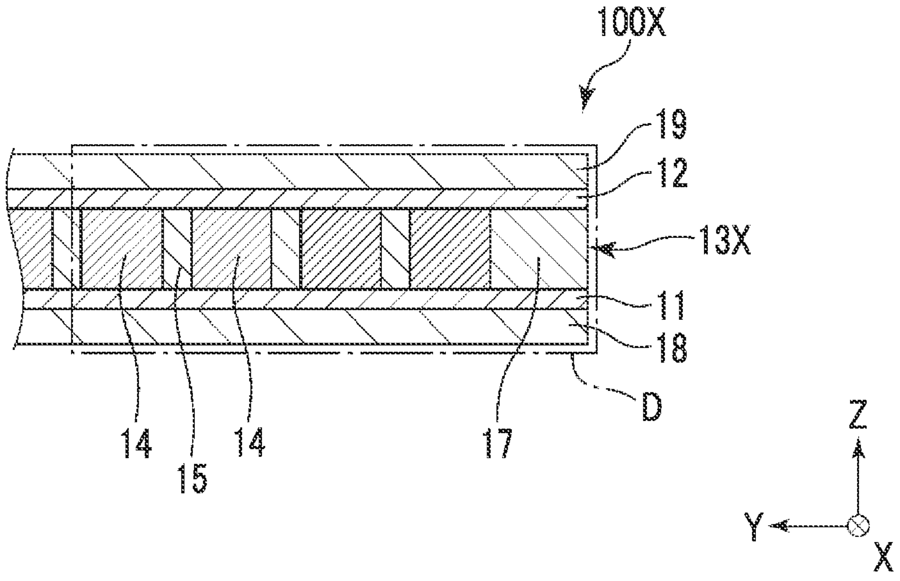
FIG. 6 is a cross-sectional view taken along a line B-B of FIG. 5.

FIG. 5 is a plan view for explaining the manufacturing method of an optical waveguide according to the comparative example. FIG. 6 is a cross-sectional view taken along a line B-B of FIG. 5. FIGS. 7 to 10 are cross-sectional views for explaining the manufacturing method of an optical waveguide according to the comparative example. In FIGS. 5 to 10, for convenience of description, the same reference numerals are given to the same configurations as those in the present embodiment. In addition, FIGS. 7 to 10 correspond to an enlarged view of a part D of FIG. 6.

A workpiece 100X shown in FIG. 5 is the same as the workpiece 100 in the present embodiment, except that the area ratio of the side cladding portion is less than 20%. Specifically, in the workpiece 100X shown in FIGS. 5 and 6, the area of the second side cladding portion 17 is smaller than that of the workpiece 100 shown in FIGS. 2 and 3. Accordingly, the area ratio of the side cladding portion in the entire workpiece 100X is as small as less than 20%. Such an area ratio of the side cladding portion causes the occurrence of deformation such as warpage in the member in the manufacturing process of the workpiece 100*x*. Hereinafter, the reason why such a problem occurs will be described.

Figure 7A:
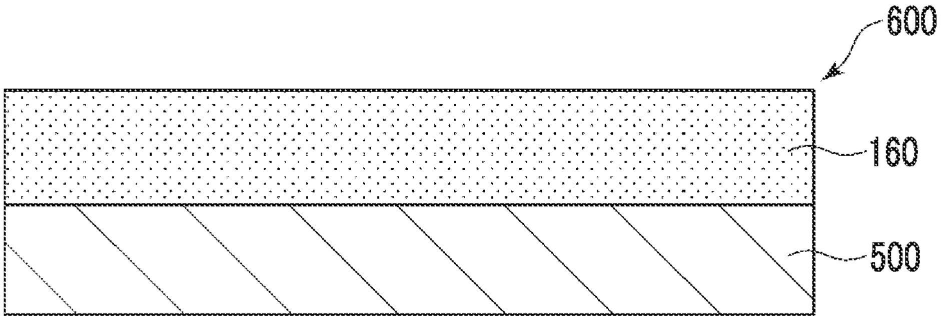
FIGS. 7A and 7B are cross-sectional views for explaining the manufacturing method of an optical waveguide according to the comparative example.

In the manufacturing method of an optical waveguide according to the comparative example, first, as shown in FIG. 7A, a core film 600 (pre-exposure laminate) which is a laminate of a substrate 500 and a core forming layer 160 is prepared.

Examples of a method of forming the core forming layer 160 include a method of applying a varnish-like resin composition for forming core onto the substrate 500 and then drying the resin composition, and a method of laminating a resin film on the substrate 500.

Examples of the resin composition for forming core include a composition containing a polymer, a monomer, a polymerization initiator, and the like.

Examples of the monomer include a photopolymerizable monomer which reacts in an irradiated region by irradiation with active radiation such as visible light, ultraviolet light, infrared light, laser light, electron beam, and X-rays to produce a reactant. In addition, the monomer is movable in an in-plane direction orthogonal to a film thickness in the core forming layer 160 during the irradiation with an active radiation R, and as a result, a difference in refractive index may be generated between an irradiated region 301 and a non-irradiated region 302 in a core layer 13X shown in FIG. 6.

Figure 7B:
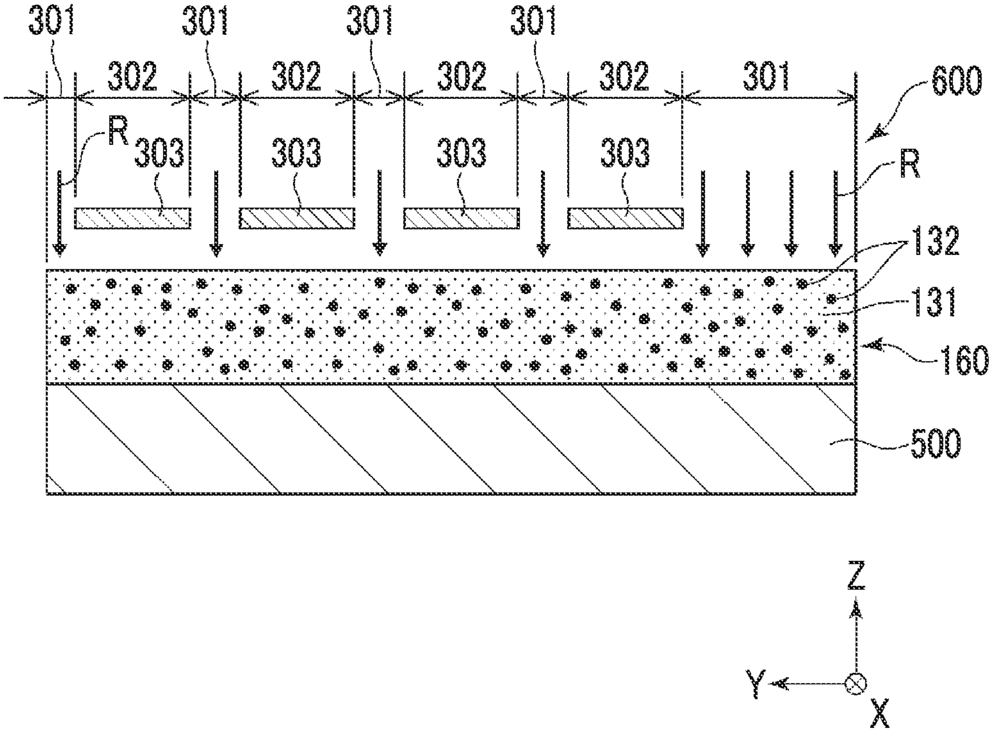

Next, as shown in FIG. 7B, a part of the core forming layer 160 is irradiated with an active radiation R through a photomask 303. FIG. 7B shows a polymer 131 and a monomer 132 contained in the core forming layer 160. The monomer 132 or a structure derived from the monomer 132 has a lower refractive index than the polymer 131.

Figure 8D:
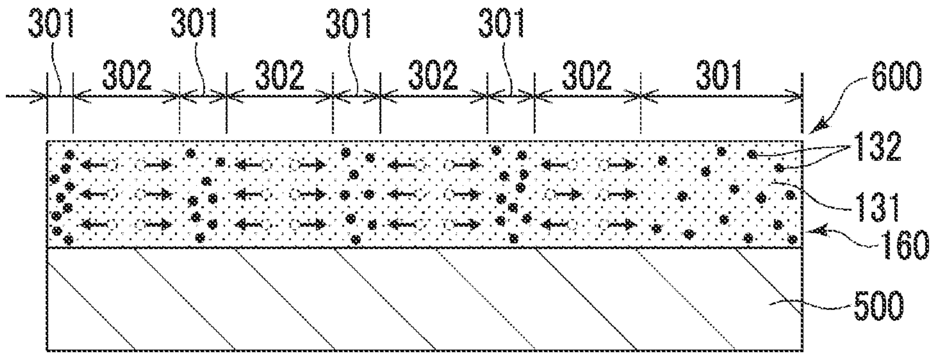
FIGS. 8D to 8F are cross-sectional views for explaining the manufacturing method of an optical waveguide according to the comparative example.
Figure 8E:
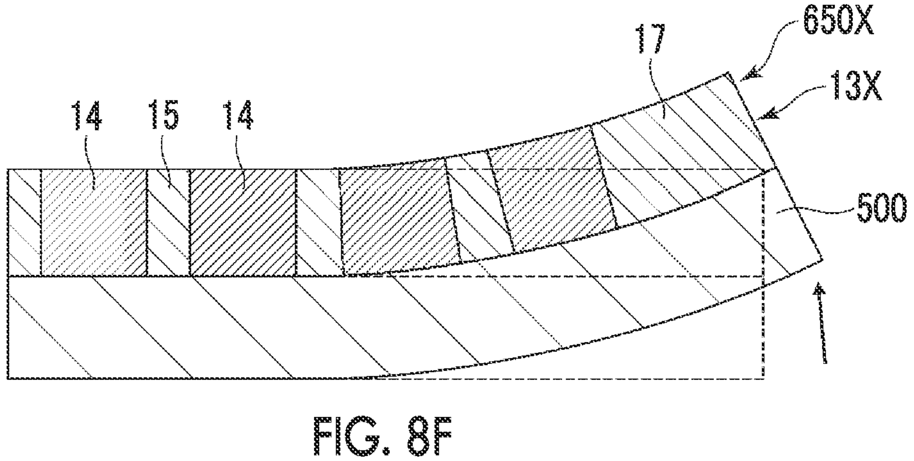

After the core forming layer 160 is irradiated with the active radiation R, the core forming layer 160 is heated. By this heating, the polymerization initiator present in an irradiated region 301 is activated to proceed a reaction of the monomer 132. Therefore, a difference in concentration of the monomer 132 occurs, and the monomer 132 moves accordingly. As a result, as shown in FIG. 8D, a concentration of the monomer 132 in the irradiated region 301 increases, and a concentration of the monomer 132 in a non-irradiated region 302 decreases. Accordingly, a refractive index of the irradiated region 301 is lowered under the influence of the monomer 132, and a refractive index of the non-irradiated region 302 is increased under the influence of the polymer 131. As a result, as shown in FIG. 8E, the core layer 13X including the core portion 14, the first side cladding portion 15, and the second side cladding portion 17 is obtained. Thereafter, a post-exposure laminate 650X having the substrate 500 and the core layer 13X formed thereon is obtained.

Here, at least a part of the monomer 132 contained in the non-irradiated region 302 moves from the non-irradiated region 302 to the irradiated region 301, as described above. In this case, the volume of the non-irradiated region 302 is likely to be reduced (contracted) by heating. In addition, since most of the monomers 132 contained in the non-irradiated region 302 are not polymerized, the monomer 132 is easily volatilized by heating. The volatilization of the monomer 132 also causes the non-irradiated region 302 to contract. For this reason, in a case where the area ratio of the non-irradiated region 302 is large, a volume shrinkage of the core forming layer 160 is large. As a result, the post-exposure laminate 650X is deformed, such as warpage. The deformation has a bad influence on the manufacturing of the optical waveguide 1X using the post-exposure laminate 650X, which will be described later.

Figure 8F:
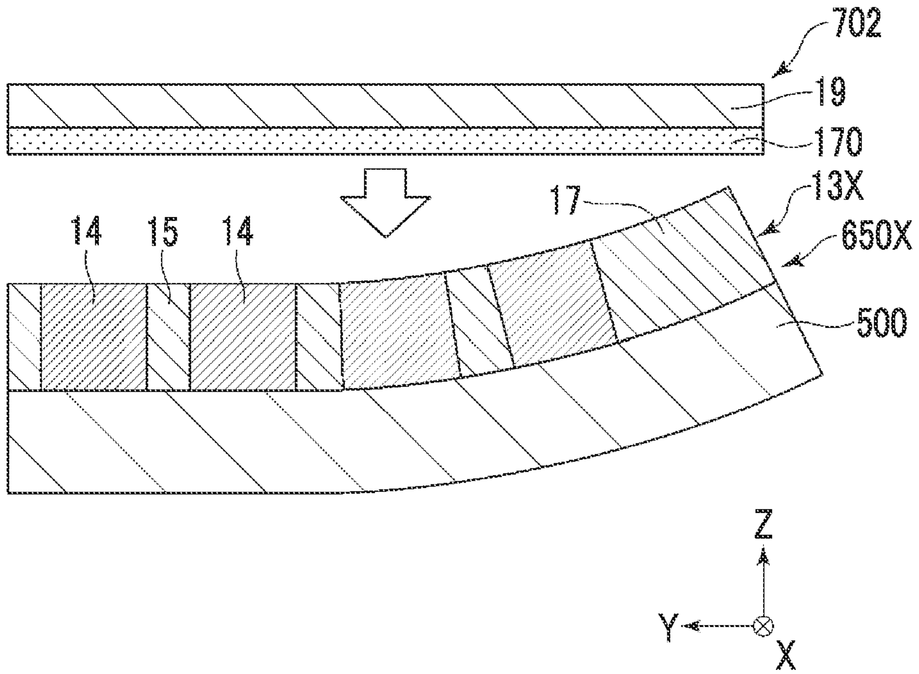
Figure 9G:
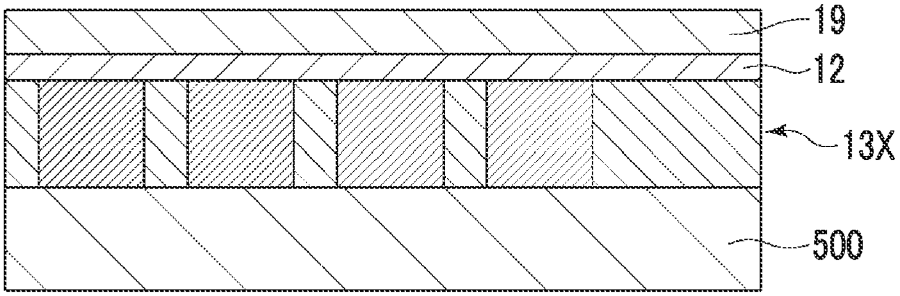
FIGS. 9G to 9I are cross-sectional views for explaining the manufacturing method of an optical waveguide according to the comparative example.

After the post-exposure laminate 650X is manufactured, as shown in FIG. 8F, a cladding film 702 which is a laminate of a clad forming layer 170 and a second cover layer 19 is laminated on the core layer 13X. Thereafter, the obtained member is heated. As a result, the core layer 13X and the cladding film 702 are bonded to each other, and the second cladding layer 12 covering the core layer 13X is obtained as shown in FIG. 9G.

Figure 9H:
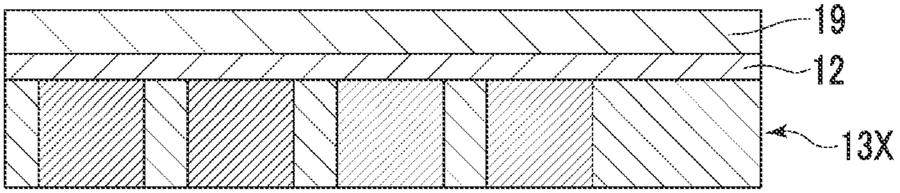

Next, as shown in FIG. 9H, the substrate 500 is peeled off from the core layer 13X.

Figure 9I:
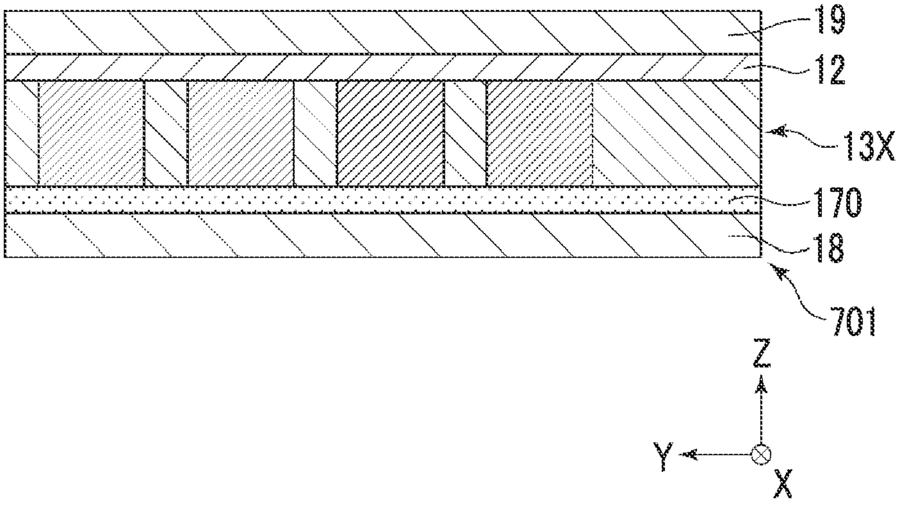
Figure 10J:
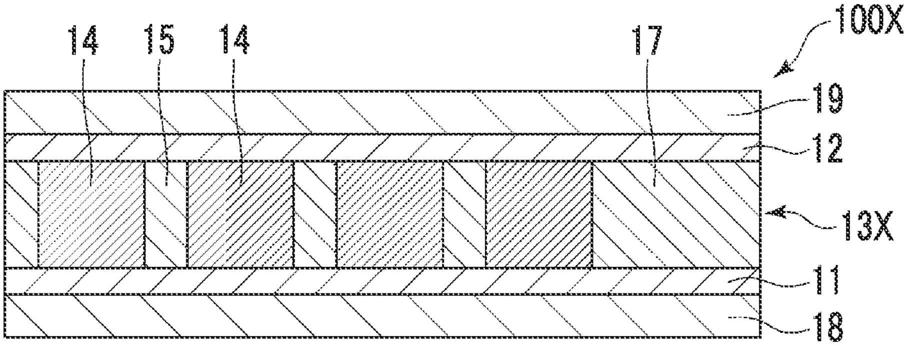
FIGS. 10J to 10L are cross-sectional views for explaining the manufacturing method of an optical waveguide according to the comparative example.

Next, as shown in FIG. 9I, a cladding film 701 which is a laminate of a clad forming layer 170 and a first cover layer 18 is laminated on the core layer 13X. Thereafter, the obtained member is heated. As a result, the core layer 13X and the cladding film 701 are bonded to each other, and the first cladding layer 11 covering the core layer 13X is obtained as shown in FIG. 10J. In the manner described above, the workpiece 100X shown in FIG. 10J is obtained.

Figure 10K:
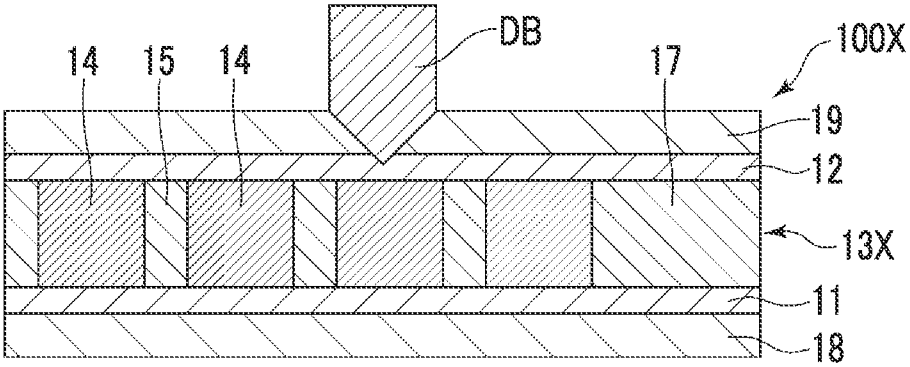
Figure 10L:
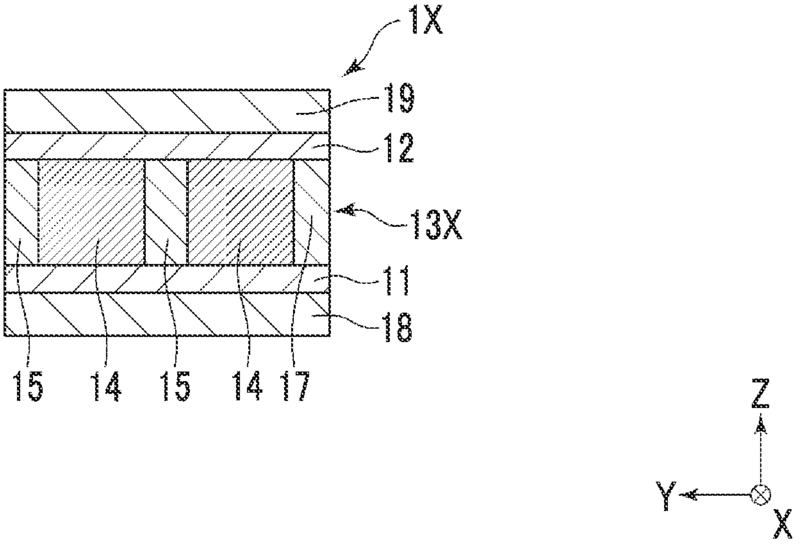

Next, as shown in FIG. 10K, the workpiece 100X is cut along the cutting line CL shown in FIG. 5 by a dicing blade DB. As a result, as shown in FIG. 10L, an optical waveguide 1X is cut out.

In the manufacturing method of an optical waveguide according to the comparative example, as described above, the area ratio of the side cladding portion in the workpiece 100X is less than 20%. The side cladding portion corresponds to the irradiated region 301. Therefore, in the manufacturing method of an optical waveguide according to the comparative example, the area occupied by the irradiated region 301 is less than 20% of the entire area of the core forming layer 160. In this case, the post-exposure laminate 650X is deformed such as warpage as shown in FIG. 8E. The deformation causes a problem in the manufacturing of the workpiece 100X, resulting in a decrease in manufacturing efficiency of the optical waveguide 1X. According to the manufacturing method of an optical waveguide according to the present embodiment, which will be described below, the above-described problems can be solved.

3. MANUFACTURING METHOD OF OPTICAL WAVEGUIDE

Next, the manufacturing method of an optical waveguide according to the embodiment will be described.

Figure 11:
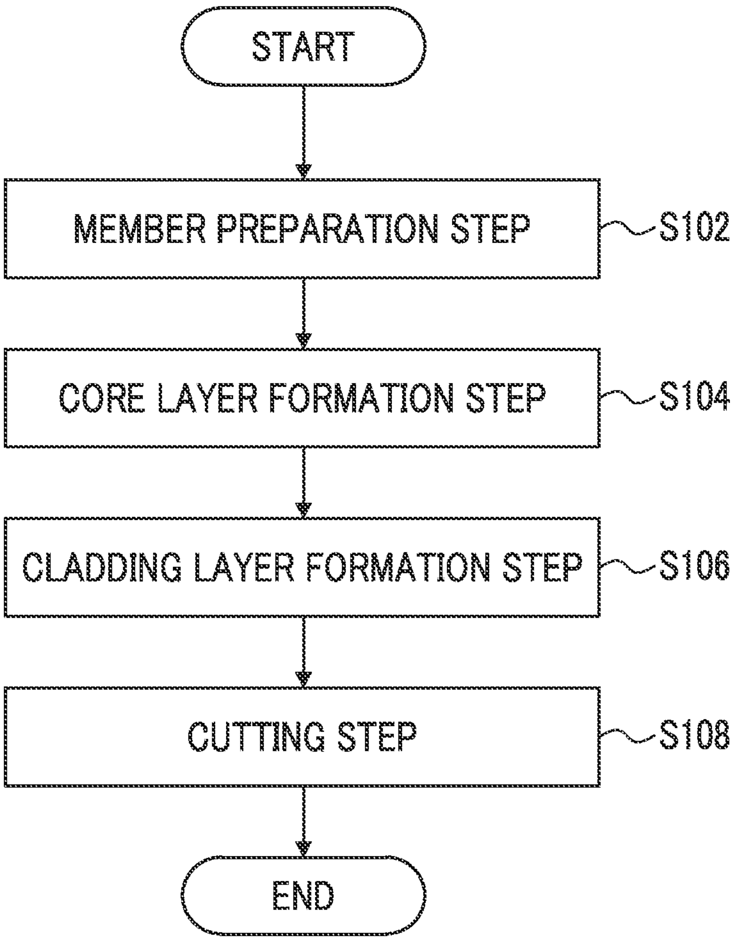
FIG. 11 is a process diagram for explaining the manufacturing method of an optical waveguide according to the embodiment.

FIG. 11 is a process diagram for explaining the manufacturing method of an optical waveguide according to the embodiment. FIGS. 12 to 15 are cross-sectional views for explaining the manufacturing method of an optical waveguide according to the embodiment. FIGS. 12 to 15 correspond to enlarged views of a part C of FIG. 3.

The manufacturing method of an optical waveguide shown in FIG. 11 includes a member preparation step S102, a core layer formation step S104, a cladding layer formation step S106, and a cutting step S108. Hereinafter, each step will be sequentially described.

3.1. Member Preparation Step

Figure 12A:
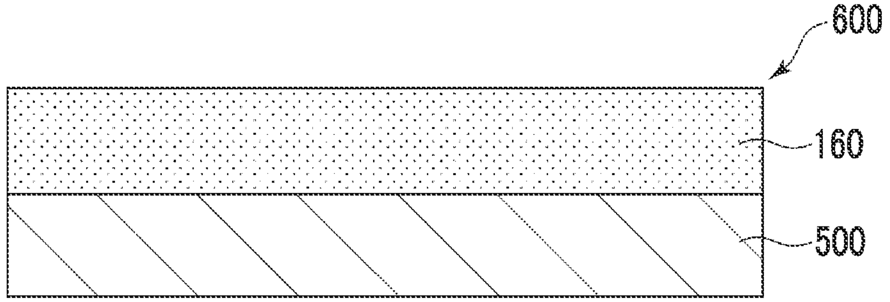
FIGS. 12A to 12C are cross-sectional views for explaining the manufacturing method of an optical waveguide according to the embodiment.

In the member preparation step S102, the core film 600 shown in FIG. 12A is prepared. In addition, in the member preparation step S102, the cladding film 702 shown in FIG.

Figure 14G:
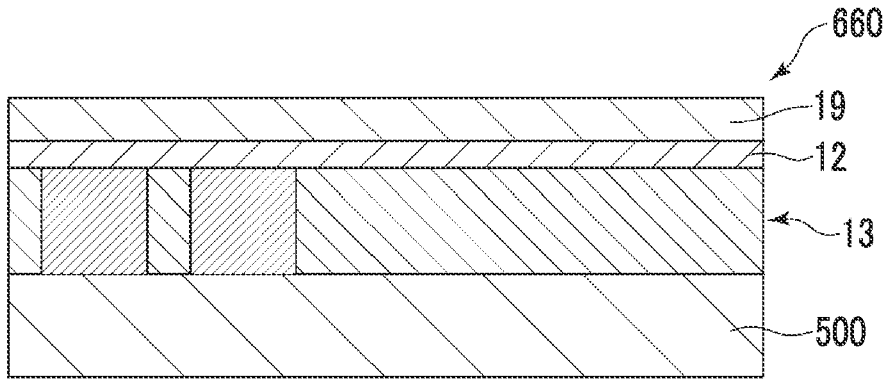
FIGS. 14G to 14I are cross-sectional views for explaining the manufacturing method of an optical waveguide according to the embodiment.
Figure 14H:
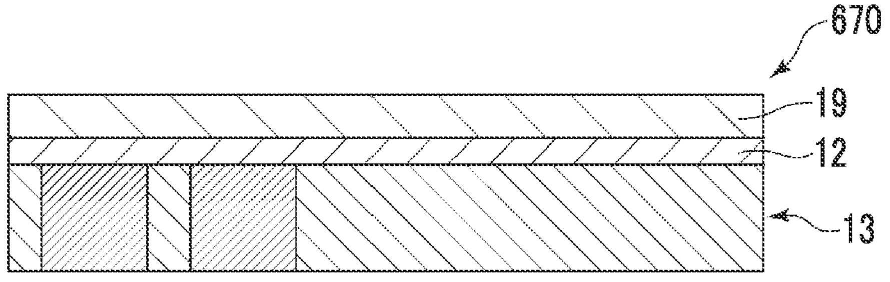
Figure 14I:
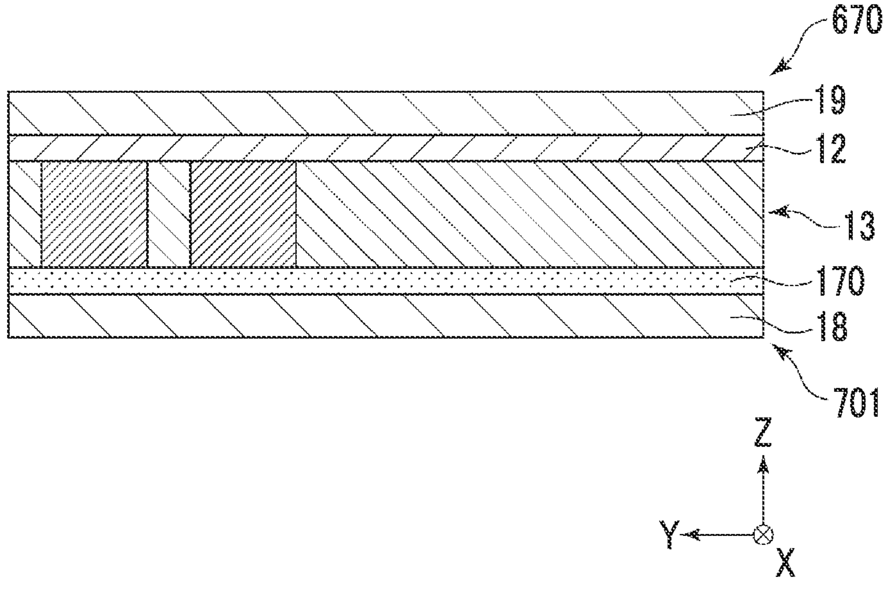

13F and the cladding film 701 shown in FIG. 14I are prepared. Hereinafter, these members will be sequentially described.

3.1.1. Core Film

As shown in FIG. 12A, the core film 600 is a laminate of the substrate 500 and the core forming layer 160. The core film 600 has a film shape, and may be in a sheet shape or a roll shape which can be wound.

Examples of a method of forming the core forming layer 160 include a method of applying a varnish-like resin composition for forming core onto the substrate 500 and then drying the resin composition, and a method of laminating a resin film on the substrate 500.

In the method of applying the resin composition, for example, a method of applying the resin composition using various coaters such as a spin coater, a die coater, a comma coater, and a curtain coater, a printing method such as screen printing, and the like are used.

In the method of laminating the resin film, a method of laminating a film-like resin film produced from a varnish-like resin composition for forming core using, for example, roll lamination, vacuum roll lamination, flat plate lamination, vacuum flat plate lamination, normal pressure press, vacuum press, or the like is used.

3.1.1.1. Substrate

For the substrate 500, for example, a resin film is used. Examples of a constituent material of the substrate 500 include polyolefins such as polyethylene terephthalate (PET), polyethylene naphthalate (PEN), polyethylene, and polypropylene, polyimide, polyamide, polyetherimide, polyamideimide, fluororesins such as polytetrafluoroethylene (PTFE), polycarbonate, polyethersulfone, polyphenylene sulfide, and liquid crystal polymers.

The substrate 500 may be subjected to a release treatment or the like to facilitate peeling of the core layer 13 and the substrate 500, as necessary.

3.1.1.2. Resin Composition for Forming Core

Examples of the above-described resin composition for forming core include a composition containing a polymer, a monomer, a polymerization initiator, and the like.

3.1.1.2.1. Polymer

Examples of the polymer include cyclic ether resins such as an acrylic resin, a methacrylic resin, polycarbonate, polystyrene, an epoxy-based resin, and an oxetane resin, polyamide, polyimide, polybenzoxazole, polysilane, polysilazane, a silicone-based resin, a fluorine-based resin, polyurethane, a polyolefin-based resin, polybutadiene, polyisoprene, polychloroprene, polyesters such as PET and PBT, polyethylene succinate, polysulfone, polyether, cyclic olefin-based resins such as a benzocyclobutene-based resin and a norbornene-based resin, and a phenoxy resin; and one or a combination of two or more of these resins may be used as a polymer alloy, a polymer blend (mixture), a copolymer, or the like.

Among these, as the polymer, an acrylic resin, a phenoxy resin, or a cyclic olefin-based resin is preferably used.

Examples of the acrylic resin include a polymer of an acrylic compound including one or more selected from the group consisting of a monofunctional acrylate, a polyfunctional acrylate, a monofunctional methacrylate, a polyfunctional methacrylate, a urethane acrylate, a urethane methacrylate, an epoxy acrylate, an epoxy methacrylate, a polyester acrylate, and a urea acrylate. In addition, the acrylic resin may have a polyester skeleton, a polypropylene glycol skeleton, a bisphenol skeleton, a fluorene skeleton, a tricyclodecane skeleton, a biscyclopentadiene skeleton, or the like.

Examples of the phenoxy resin include a compound including, as a constitutional unit of a copolymer component, bisphenol A, a bisphenol A-type epoxy compound or a derivative thereof, bisphenol F, or a bisphenol F-type epoxy compound or a derivative thereof.

A content of the polymer is, for example, preferably 15% by mass or more, more preferably 40% by mass or more, and still more preferably 60% by mass or more of the total solid content of the resin composition for forming core. As a result, mechanical characteristics of the core layer 13 are improved. In addition, the content of the polymer contained in the resin composition for forming core is preferably 95% by mass or less and more preferably 90% by mass or less of the total solid content of the resin composition for forming core. As a result, optical characteristics of the core layer 13 are improved.

The total solid content of the resin composition for forming core refers to non-volatile contents in the composition, and refers to a residue obtained by removing volatile components such as water and a solvent.

3.1.1.2.2. Monomer

The monomer may be any compound having a polymerizable moiety in the molecular structure and is not particularly limited, and examples thereof include an acrylic acid (methacrylic acid)-based monomer, an epoxy-based monomer, an oxetane-based monomer, a norbornene-based monomer, a vinyl ether-based monomer, a styrene-based monomer, and a photodimerizable monomer; and one or two or more of these monomers are used in combination.

Among these, as the monomer, an acrylic acid (methacrylic acid)-based monomer or an epoxy-based monomer is preferably used.

Examples of the acrylic acid (methacrylic acid)-based monomer include a compound having two or more ethylenically unsaturated groups, and a difunctional or tri- or higher functional (meth)acrylate. Specific examples thereof include aliphatic (meth)acrylates, alicyclic (meth)acrylates, aromatic (meth)acrylates, heterocyclic (meth)acrylates, or ethoxylated, propoxylated, ethoxylated and propoxylated, or caprolactone-modified products thereof. In addition, the monomer may have a bisphenol skeleton, a urethane skeleton, or the like in the molecule.

Examples of the epoxy-based monomer include an alicyclic epoxy compound, an aromatic epoxy compound, and an aliphatic epoxy compound.

As the monomer, a photopolymerizable monomer, which reacts in an irradiated region by irradiation with active radiation such as visible light, ultraviolet light, infrared light, laser light, electron beam, and X-rays to produce a reactant, may be used. In addition, the monomer is movable in an in-plane direction orthogonal to a film thickness in the core forming layer 160 during the irradiation with active radiation, and as a result, a difference in refractive index may be generated between the irradiated region and the non-irradiated region in the core layer 13.

A content of the monomer is preferably 1 part by mass or more and 70 parts by mass or less and more preferably 10 parts by mass or more and 60 parts by mass or less with respect to 100 parts by mass of the polymer. As a result, the above-described formation of the difference in refractive index, that is, the refractive index modulation can occur more reliably.

3.1.1.2.3. Polymerization Initiator

The polymerization initiator is appropriately selected depending on the type of polymerization reaction or cross-linking reaction of the monomer. As the polymerization initiator, for example, a radical polymerization initiator such as an acrylic acid (methacrylic acid)-based monomer and a styrene-based monomer, or a cationic polymerization initiator such as an epoxy-based monomer, an oxetane-based monomer, and a vinyl ether-based monomer can be used.

Examples of the radical polymerization initiator include benzophenones and acetophenones. Specific examples thereof include Irgacure (registered trademark) 651, Irgacure 819, Irgacure 2959, and Irgacure 184 (all manufactured by IGM Japan, Inc.).

Examples of the cationic polymerization initiator include a Lewis acid-generating compound such as a diazonium salt, and a Brønsted acid-generating compound such as an iodonium salt and a sulfonium salt. Specific examples thereof include Adeka Optomer SP-170 (manufactured by Adeka Corporation), Sanaid SI-100L (manufactured by Sanshin Chemical Industry Co., Ltd.), and Rhodorsil 2074 (manufactured by Rhodia Japan Inc.).

A content of the polymerization initiator is preferably 0.01 parts by mass or more and 5 parts by mass or less and more preferably 0.05 parts by mass or more and 3 parts by mass or less with respect to 100 parts by mass of the polymer. As a result, the monomer can be rapidly reacted without deteriorating the optical characteristics and mechanical characteristics of the core layer 13.

3.1.1.2.4. Others

The resin composition for forming core may further contain, for example, a cross-linking agent, a sensitizer (a photosensitizer), a catalyst precursor, a co-catalyst, an antioxidant, an ultraviolet absorber, a light stabilizer, a silane coupling agent, a coating surface improver, a thermal polymerization inhibitor, a leveling agent, a surfactant, a colorant, a preservative stabilizer, a plasticizer, a lubricant, a filler, inorganic particles, an anti-deterioration agent, a wetting property improver, an antistatic agent, and the like.

3.1.1.2.5. Solvent

By adding the above-described components to a solvent and stirring, the varnish-like resin composition for forming core is obtained. The obtained composition may be subjected to a filtration treatment using, for example, a PTFE filter having a pore size of 0.2 μm. In addition, the obtained composition may be subjected to a mixing treatment with various mixers.

Examples of the solvent contained in the resin composition for forming core include organic solvents such as acetone, methyl ethyl ketone, methyl isobutyl ketone, toluene, ethyl acetate, cyclohexane, heptane, cyclohexane, cyclohexanone, tetrahydrofuran, dimethylformamide, dimethylacetamide, dimethylsulfoxide, ethylene glycol, ethylene glycol monomethyl ether, ethylene glycol monoethyl ether, propylene glycol monomethyl ether, propylene glycol monoethyl ether, diethylene glycol dimethyl ether, ethylene glycol monomethyl ether acetate, propylene glycol monomethyl ether acetate, cellosolves, carbitols, anisole, and N-methylpyrrolidone; and one kind or a mixture of two or more kinds thereof is used.

3.1.2. Cladding Film

Figure 13D:
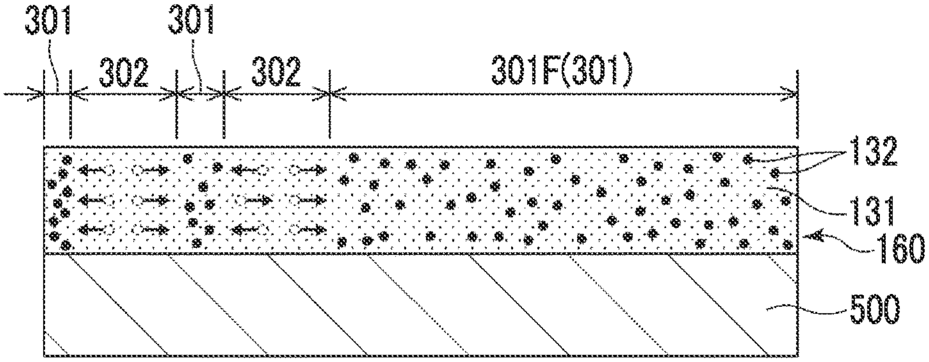
FIGS. 13D to 13F are cross-sectional views for explaining the manufacturing method of an optical waveguide according to the embodiment.
Figure 13E:
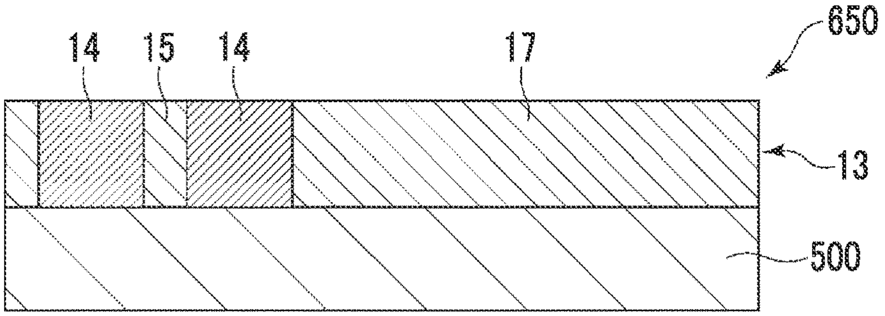
Figure 13F:
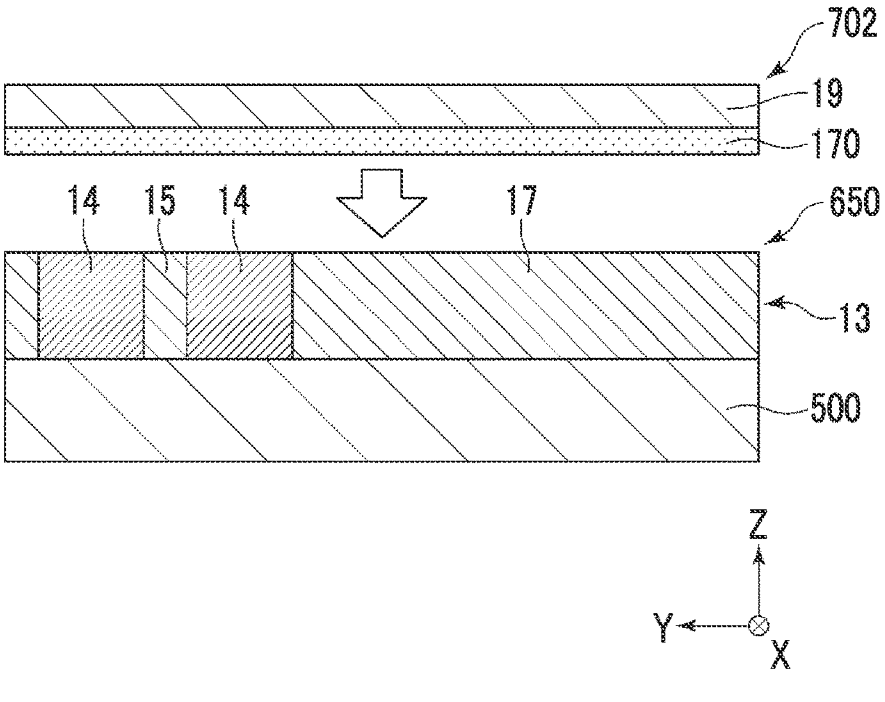

As shown in FIG. 14I, the cladding film 701 is a laminate of the first cover layer 18 and the clad forming layer 170. As shown in FIG. 13F, the cladding film 702 is a laminate of the second cover layer 19 and the clad forming layer 170. The cladding films 701 and 702 have a film shape, and may be in a sheet shape or a roll shape which can be wound.

Examples of the method of forming the clad forming layer 170 include a method of applying a varnish-like resin composition for forming clad onto the cover layer and then drying the resin composition, and a method of laminating a resin film on the cover layer.

In the method of applying the resin composition, for example, a method of applying the resin composition using various coaters such as a spin coater, a die coater, a comma coater, and a curtain coater, a printing method such as screen printing, and the like are used.

In the method of laminating the resin film, a method of laminating a film-like resin film produced from the varnish-like resin composition for forming clad using, for example, roll lamination, vacuum roll lamination, flat plate lamination, vacuum flat plate lamination, normal pressure press, vacuum press, or the like is used.

3.1.2.1. Cover Layer

Film thicknesses of the first cover layer 18 and the second cover layer 19 are not particularly limited, but are preferably approximately 1 to 200 μm, more preferably approximately 3 to 100 μm, and still more preferably approximately 5 to 50 μm. In a case where the film thickness of each of the cover layers is within the above-described range, it is possible to suppress an adverse effect of the workpiece 100 by being too thick, for example, the flexibility of the optical waveguide 1 to be manufactured is reduced, while ensuring the ability to protect the core layer 13 and the like by the first cover layer 18 and the second cover layer 19.

The film thicknesses of the first cover layer 18 and the second cover layer 19 may be different from each other, but are preferably the same as each other. Accordingly, it is possible to suppress warpage of the optical waveguide 1 due to the difference in film thickness. The same film thickness means that the difference in film thickness is 5 μm or less.

Examples of main materials of the first cover layer 18 and the second cover layer 19 include materials including various resins, for example, polyolefins such as polyethylene terephthalate (PET), polyethylene naphthalate (PEN), polyethylene, and polypropylene, polyimide, polyamide, polyetherimide, polyamideimide, fluororesins such as polytetrafluoroethylene (PTFE), polycarbonate, polyethersulfone, polyphenylene sulfide, and liquid crystal polymers.

The main materials of the first cover layer 18 and the second cover layer 19 may be different from each other, but are preferably the same as each other. Accordingly, it is possible to suppress warpage of the optical waveguide 1 due to the difference in main material.

An elastic modulus of the first cover layer 18 and the second cover layer 19 is preferably 1 to 12 GPa, more preferably 2 to 11 GPa, and still more preferably 3 to 10 GPa. The above-described elastic modulus is a tensile elastic modulus.

3.1.2.2. Resin Composition for Forming Clad

Examples of the resin composition for clad include a composition containing a polymer, a monomer, a polymerization initiator, and the like.

3.1.2.2.1. Polymer

Examples of the polymer include cyclic ether resins such as an acrylic resin, a methacrylic resin, polycarbonate, polystyrene, an epoxy-based resin, and an oxetane resin, polyamide, polyimide, polybenzoxazole, polysilane, polysilazane, a silicone-based resin, a fluorine-based resin, polyurethane, a polyolefin-based resin, polybutadiene, polyisoprene, polychloroprene, polyesters such as PET and PBT, polyethylene succinate, polysulfone, polyether, cyclic olefin-based resins such as a benzocyclobutene-based resin and a norbornene-based resin, and a phenoxy resin; and one or a combination of two or more of these resins may be used as a polymer alloy, a polymer blend (mixture), a copolymer, or the like.

Among these, as the polymer, an acrylic resin, a phenoxy resin, or a cyclic olefin-based resin is preferably used.

Examples of the acrylic resin include a polymer of an acrylic compound including one or more selected from the group consisting of a monofunctional acrylate, a polyfunctional acrylate, a monofunctional methacrylate, a polyfunctional methacrylate, a urethane acrylate, a urethane methacrylate, an epoxy acrylate, an epoxy methacrylate, a polyester acrylate, and a urea acrylate. In addition, the acrylic resin may have a polyester skeleton, a polypropylene glycol skeleton, a bisphenol skeleton, a fluorene skeleton, a tricyclodecane skeleton, a biscyclopentadiene skeleton, or the like.

Examples of the phenoxy resin include a compound including, as a constitutional unit of a copolymer component, bisphenol A, a bisphenol A-type epoxy compound or a derivative thereof, bisphenol F, or a bisphenol F-type epoxy compound or a derivative thereof.

In addition, the polymer may contain a thermosetting resin as necessary. Examples of the thermosetting resin include an amino resin, an isocyanate compound, a block isocyanate compound, a maleimide compound, a benzoxazine compound, an oxazoline compound, a carbodiimide compound, a cyclocarbonate compound, a polyfunctional oxetane compound, an episulfide resin, and an epoxy resin.

A content of the polymer is, for example, preferably 15% by mass or more, more preferably 40% by mass or more, and still more preferably 60% by mass or more of the total solid content of the resin composition for forming clad. As a result, mechanical characteristics of the first cladding layer 11 and the second cladding layer 12 are improved. In addition, the content of the polymer contained in the resin composition for forming clad is preferably 95% by mass or less and more preferably 90% by mass or less of the total solid content of the resin composition for forming clad. As a result, optical characteristics of the first cladding layer 11 and the second cladding layer 12 are improved.

The total solid content of the resin composition for forming clad refers to non-volatile contents in the composition, and refers to a residue obtained by removing volatile components such as water and a solvent.

3.1.2.2.2. Monomer

The monomer may be any compound having a polymerizable moiety in the molecular structure and is not particularly limited, and examples thereof include an acrylic acid (methacrylic acid)-based monomer, an epoxy-based monomer, an oxetane-based monomer, a norbornene-based monomer, a vinyl ether-based monomer, a styrene-based monomer, and a photodimerizable monomer; and one or two or more of these monomers are used in combination.

Among these, as the monomer, an acrylic acid (methacrylic acid)-based monomer or an epoxy-based monomer is preferably used.

Examples of the acrylic acid (methacrylic acid)-based monomer include a compound having two or more ethylenically unsaturated groups, and a difunctional or tri- or higher functional (meth)acrylate. Specific examples thereof include aliphatic (meth)acrylates, alicyclic (meth)acrylates, aromatic (meth)acrylates, heterocyclic (meth)acrylates, or ethoxylated, propoxylated, ethoxylated and propoxylated, or caprolactone-modified products thereof. In addition, the monomer may have a bisphenol skeleton, a urethane skeleton, or the like in the molecule.

Examples of the epoxy-based monomer include an alicyclic epoxy compound, an aromatic epoxy compound, and an aliphatic epoxy compound.

A content of the monomer is preferably 1 part by mass or more and 70 parts by mass or less and more preferably 10 parts by mass or more and 60 parts by mass or less with respect to 100 parts by mass of the polymer.

3.1.2.2.3. Polymerization Initiator

The polymerization initiator is appropriately selected depending on the type of polymerization reaction or cross-linking reaction of the monomer. As the polymerization initiator, for example, a radical polymerization initiator such as an acrylic acid (methacrylic acid)-based monomer and a styrene-based monomer, or a cationic polymerization initiator such as an epoxy-based monomer, an oxetane-based monomer, and a vinyl ether-based monomer can be used.

Examples of the radical polymerization initiator include benzophenones and acetophenones. Specific examples thereof include Irgacure 651, Irgacure 819, Irgacure 2959, and Irgacure 184 (all manufactured by IGM Japan, Inc.).

Examples of the cationic polymerization initiator include a Lewis acid-generating compound such as a diazonium salt, and a Brønsted acid-generating compound such as an iodonium salt and a sulfonium salt. Specific examples thereof include Adeka Optomer SP-170 (manufactured by Adeka Corporation), Sanaid SI-100L (manufactured by Sanshin Chemical Industry Co., Ltd.), and Rhodorsil 2074 (manufactured by Rhodia Japan Inc.).

A content of the polymerization initiator is preferably 0.01 parts by mass or more and 5 parts by mass or less and more preferably 0.05 parts by mass or more and 3 parts by mass or less with respect to 100 parts by mass of the polymer. As a result, the monomer can be rapidly reacted without deteriorating the optical characteristics and mechanical characteristics of the first cladding layer 11 and the second cladding layer 12.

3.1.2.2.4. Others

The resin composition for forming clad may further contain, for example, a cross-linking agent, a sensitizer (a photosensitizer), a catalyst precursor, a co-catalyst, an antioxidant, an ultraviolet absorber, a light stabilizer, a silane coupling agent, a coating surface improver, a thermal polymerization inhibitor, a leveling agent, a surfactant, a colorant, a preservative stabilizer, a plasticizer, a lubricant, a filler, inorganic particles, an anti-deterioration agent, a wetting property improver, an antistatic agent, and the like.

3.1.2.2.5. Solvent

By adding the above-described components to a solvent and stirring, the varnish-like resin composition for forming clad is obtained. The obtained composition may be subjected to a filtration treatment using, for example, a PTFE filter having a pore size of 0.2 μm. In addition, the obtained composition may be subjected to a mixing treatment with various mixers.

Examples of the solvent contained in the resin composition for forming clad include organic solvents such as acetone, methyl ethyl ketone, methyl isobutyl ketone, toluene, ethyl acetate, cyclohexane, heptane, cyclohexane, cyclohexanone, tetrahydrofuran, dimethylformamide, dimethylacetamide, dimethylsulfoxide, ethylene glycol, ethylene glycol monomethyl ether, ethylene glycol monoethyl ether, propylene glycol monomethyl ether, propylene glycol monoethyl ether, diethylene glycol dimethyl ether, ethylene glycol monomethyl ether acetate, propylene glycol monomethyl ether acetate, cellosolves, carbitols, anisole, and N-methylpyrrolidone; and one kind or a mixture of two or more kinds thereof is used.

The resin composition for forming clad, for forming the first cladding layer 11, and the resin composition for forming clad, for forming the second cladding layer 12, may be the same as each other or may be different from each other.

3.2. Core Layer Formation Step

In the core layer formation step S104, the core layer 13 is formed from the core forming layer 160. Specifically, a part of the core forming layer 160 is irradiated with the active radiation R to obtain the core layer 13 including the core portion 14 corresponding to the non-irradiated region 302, and the first side cladding portion 15 and the second side cladding portion 17 corresponding to the irradiated region 301.

Figure 12B:
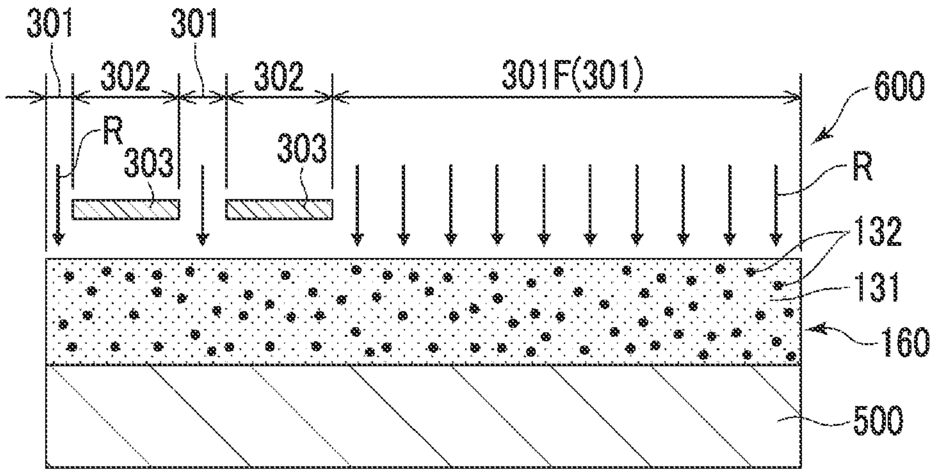

For example, a method using the photomask 303 shown in FIG. 12B is used for setting the irradiated region 301 and the non-irradiated region 302. By the irradiation with the active radiation R through the photomask 303, the irradiated region 301 and the non-irradiated region 302 can be set in correspondence with a mask pattern of the photomask 303.

Figure 12C:
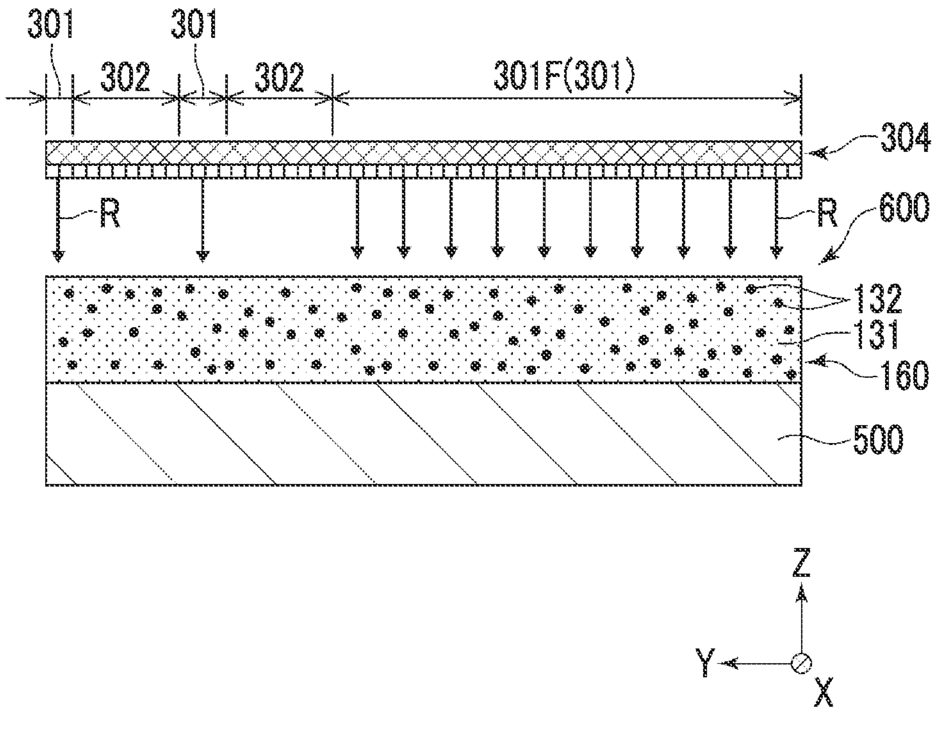

Instead of the method using the photomask 303, a method using a direct drawing exposure machine 304 may be adopted. In FIG. 12C, the active radiation R is radiated by the direct drawing exposure machine 304. Examples of the direct drawing exposure machine 304 include an exposure machine capable of selecting an irradiated region by using various spatial light modulation elements of a reflective spatial light modulation element such as a digital micromirror device (DMD) and a transmissive spatial light modulation element such as a liquid crystal display element (LCD). By using such a direct drawing exposure machine 304, it is possible to set the irradiated region 301 and the non-irradiated region 302 without using the photomask 303. As a result, it is possible to adjust the sizes of the irradiated region 301 and the non-irradiated region 302 without remaking the photomask 303, and thus it is possible to reduce and make efficient manufacturing cost of the optical waveguide 1.

The irradiation with the active radiation R may be performed a plurality of times.

FIGS. 12B and 12C show the polymer 131 and the monomer 132 contained in the core forming layer 160. In the core forming layer 160 before being irradiated with the active radiation R, the monomer 132 is substantially uniformly distributed in the polymer 131. The monomer 132 or the structure derived from the monomer 132 has a lower refractive index than the polymer 131.

After the core forming layer 160 is irradiated with the active radiation R, the core forming layer 160 is heated. By this heating, the polymerization initiator present in an irradiated region 301 is activated to proceed a reaction of the monomer 132. Therefore, a difference in concentration of the monomer 132 occurs, and the monomer 132 moves accordingly. As a result, as shown in FIG. 13D, a concentration of the monomer 132 in the irradiated region 301 increases, and a concentration of the monomer 132 in a non-irradiated region 302 decreases. Accordingly, a refractive index of the irradiated region 301 is lowered under the influence of the monomer 132, and a refractive index of the non-irradiated region 302 is increased under the influence of the polymer 131. As a result, as shown in FIG. 13E, the core layer 13 including the core portion 14, the first side cladding portion 15, and the second side cladding portion 17 is obtained. Thereafter, a post-exposure laminate 650 having the core layer 13 and the substrate 500 supporting the core layer 13 is obtained.

Examples of heating conditions of the core forming layer 160 include a heating temperature of 100° C. to 200° C. and a heating time of 10 to 180 minutes.

With this heating, the refractive index may be changed by volatilization of the monomer 132 or a change in the molecular structure of the polymer 131.

3.3. Cladding Layer Formation Step

In the cladding layer formation step S106, the first cladding layer 11 and the second cladding layer 12 are laminated on the core layer 13 included in the post-exposure laminate 650, and the substrate 500 is peeled off. As a result, the workpiece 100 is obtained.

In the present embodiment, as shown in FIG. 13F, the cladding film 702 is laminated on the upper surface of the core layer 13. Thereafter, the obtained laminate is heated. Accordingly, the core layer 13 and the cladding film 702 are bonded to each other. As a result, as shown in FIG. 14G, the second cladding layer 12 covering the core layer 13 is obtained. As a result, a first laminate 660 is obtained. Examples of heating conditions at this time include a heating temperature of 100° C. to 200° C. and a heating time of 10 to 180 minutes.

Figure 15J:
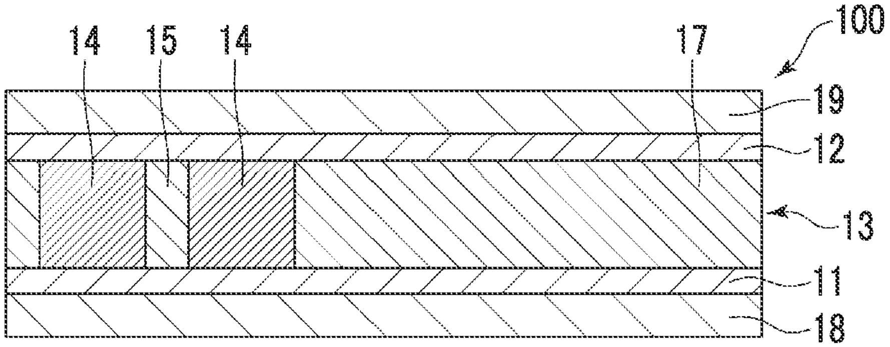
FIGS. 15J to 15L are cross-sectional views for explaining the manufacturing method of an optical waveguide according to the embodiment.

Next, as shown in FIG. 14H, the substrate 500 is peeled off from the core layer 13 of the first laminate 660. As a result, a second laminate 670 is obtained. Thereafter, as shown in FIG. 14I, the cladding film 701 is laminated on the lower surface of the core layer 13 of the second laminate 670. Thereafter, the obtained laminate is heated. Accordingly, the core layer 13 and the cladding film 701 are bonded to each other. As a result, as shown in FIG. 15, the first cladding layer 11 covering the core layer 13 is obtained. Examples of heating conditions at this time include a heating temperature of 100° C. to 200° C. and a heating time of 10 to 180 minutes, but it is preferable that the heating conditions are set to a higher temperature or a longer time than the heating conditions when the second cladding layer 12 is formed. In the manner described above, the workpiece 100 shown in FIG. 15J is obtained.

3.4. Cutting Step

Figure 15K:
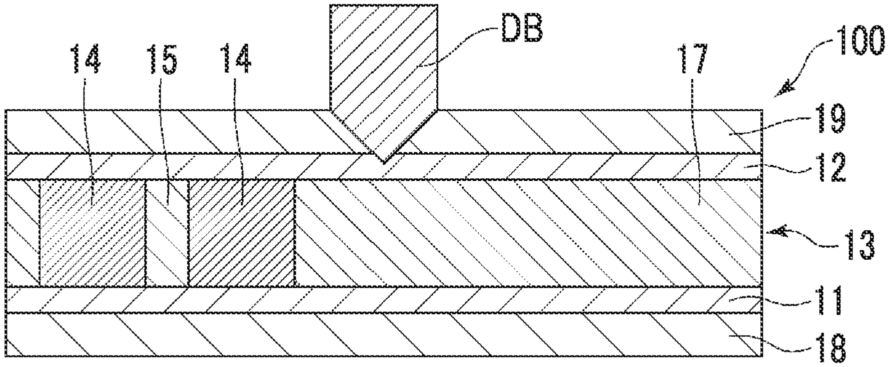

In the cutting step S108, as shown in FIG. 15K, the workpiece 100 is cut. For the cutting, for example, a dicing blade DB shown in FIG. 15K is used. Instead of cutting with the dicing blade DB, cutting with a cutting saw, a laser, a router, an ultrasonic cutter, or a water jet, or punching with a die may be used.

Figure 15L:
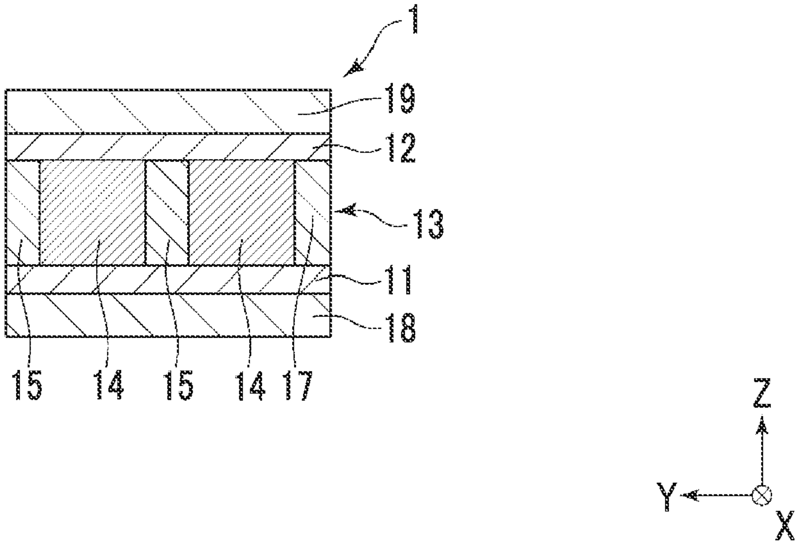

The workpiece 100 is cut along the cutting line CL shown in FIG. 2. As a result, as shown in FIG. 15L, the optical waveguide 1 is cut out.

As described above, the manufacturing method of an optical waveguide according to the present embodiment includes the member preparation step S102, the core layer formation step S104, the cladding layer formation step S106, and the cutting step S108. In the member preparation step S102, the core film 600 (pre-exposure laminate) having the substrate 500 and the core forming layer 160 laminated on the substrate 500 is prepared. In the core layer formation step S104, the core forming layer 160 is irradiated with the active radiation R to obtain the post-exposure laminate 650 having the core layer 13 which includes the core portion 14 corresponding to the non-irradiated region 302 and the side cladding portion corresponding to the irradiated region 301, and having the substrate 500 supporting the core layer 13. In the cladding layer formation step S106, the first cladding layer 11 and the second cladding layer 12, which are the cladding layer, are laminated on the core layer 13 of the post-exposure laminate 650 to obtain the workpiece 100. In the cutting step S108, the optical waveguide 1 is cut out from the workpiece 100.

In addition, the irradiated region 301 includes a frame-shaped part 301F which extends along the outer edge of the core forming layer 160 and has a frame shape. Furthermore, the area of the irradiated region 301 is 20% or more of the entire area of the core forming layer 160. Hereinafter, the proportion of the area of the irradiated region 301 to the total area of the core forming layer 160 is referred to as the area ratio of the irradiated region 301.

According to such a configuration, since the area ratio of the irradiated region 301 is secured to 20% or more, a region where the volume is reduced to a small extent can be sufficiently secured, so that it is possible to suppress the occurrence of significant deformation such as warpage in the post-exposure laminate 650. In particular, since the irradiated region 301 includes the frame-shaped part 301F, it is possible to effectively suppress the deformation of the entire post-exposure laminate 650. Accordingly, in a case where the workpiece 100 is manufactured from the post-exposure laminate 650, the manufacturing efficiency of the workpiece 100 can be easily increased. As a result, the optical waveguide 1 can be manufactured with high efficiency.

In addition, the area ratio of the irradiated region 301 is preferably 40% or more and more preferably 50% or more. On the other hand, the upper limit value of the area ratio of the irradiated region 301 is not particularly set, but is preferably 80% or less and more preferably 75% or less in consideration of the manufacturing efficiency of the optical waveguide 1 cut out from the workpiece 100.

Furthermore, the frame-shaped part 301F is preferably 50% or more and more preferably 70% or more of the irradiated region 301. Accordingly, the occupied area of the second side cladding portion 17 corresponding to the frame-shaped part 301F is larger than the occupied area of the first side cladding portion 15. As described above, the second side cladding portion 17 effectively suppresses the deformation of the entire post-exposure laminate 650. Therefore, in a case where the area ratio of the frame-shaped part 301F is within the above-described range, the post-exposure laminate 650 with particularly little deformation is obtained.

In addition, the core forming layer 160 contains the polymer 131 and the monomer 132. It is preferable that the core forming layer 160 is configured such that the monomer 132 moves by the irradiation with the active radiation R to cause a difference in refractive index between the irradiated region 301 and the non-irradiated region 302.

According to such a configuration, a larger difference in refractive index can be formed in the core forming layer 160 due to the movement and volatilization of the monomer 132. Accordingly, the core portion 14 having excellent transmission efficiency can be obtained.

In addition, the workpiece 100 includes the core layer 13, and the first cladding layer 11 and the second cladding layer 12 which are two cladding layers. The first cladding layer 11 and the second cladding layer 12 are laminated to each other through the core layer 13.

The step of obtaining the workpiece 100 described above, that is, the cladding layer formation step S106 includes an operation of laminating the second cladding layer 12 on the core layer 13 included in the post-exposure laminate 650 to obtain the first laminate 660, an operation of peeling off the substrate 500 from the first laminate 660 to obtain a remainder as the second laminate 670, and an operation of laminating the first cladding layer 11 on the core layer 13 included in the second laminate 670 to obtain the workpiece 100.

According to such a configuration, since the workpiece 100 has a structure in which the core layer 13 is sandwiched between the first cladding layer 11 and the second cladding layer 12, the difference in refractive index between the core layer 13, and the first cladding layer 11 and the second cladding layer 12 is stable. Therefore, by using such a workpiece 100, the optical waveguide 1 with a small transmission loss can be efficiently manufactured.

In addition, a process of sequentially laminating the cladding films 701 and 702 manufactured separately to manufacture the first cladding layer 11 and the second cladding layer 12 can be adopted. As a result, the workpiece 100 having a multilayer structure and the optical waveguide 1 can be efficiently manufactured without using the manufacturing process using the liquid composition.

In addition, in the present embodiment, the workpiece 100 further includes the first cover layer 18 and the second cover layer 19. The first cover layer 18 and the second cover layer 19 are laminated to sandwich the core layer 13, and the first cladding layer 11 and the second cladding layer 12.

According to such a configuration, the first cover layer 18 and the second cover layer 19 can protect the first cladding layer 11 and the second cladding layer 12. Accordingly, the durability of the workpiece 100 can be improved. In addition, the first cover layer 18 is laminated with the first cladding layer 11 and is provided as the cladding film 701 for manufacturing the workpiece 100. Furthermore, the second cover layer 19 is laminated with the second cladding layer 12 and is provided as the cladding film 702 for manufacturing the workpiece 100. Therefore, operability is improved in a case where the first cladding layer 11 and the second cladding layer 12 are laminated on the core layer 13.

4. MARK

In the above-described manufacturing method of an optical waveguide, it is necessary to align the workpiece 100 with the device in the irradiation with the active radiation R and the cutting of the workpiece 100. The workpiece 100 shown in FIG. 1 has various marks used for the alignment.

The workpiece 100 shown in FIG. 2 has a mark 803 provided at a position overlapping the second side cladding portion 17.

The second side cladding portion 17 has a part having a frame shape and surrounding the core portion 14, and the mark 803 is provided in such a part. Therefore, the mark 803 can be used as a position reference in a case where the optical waveguide 1 is cut out from the workpiece 100. A usage method of the mark 803 is not limited thereto. For example, before the cutting out, the mark 803 can be used as a position reference with respect to the workpiece 100, in a case where an optical path conversion unit such as a mirror is formed in the optical waveguide 1, in a case where an optical component is assembled in the optical waveguide 1, and the like.

Figure 16:
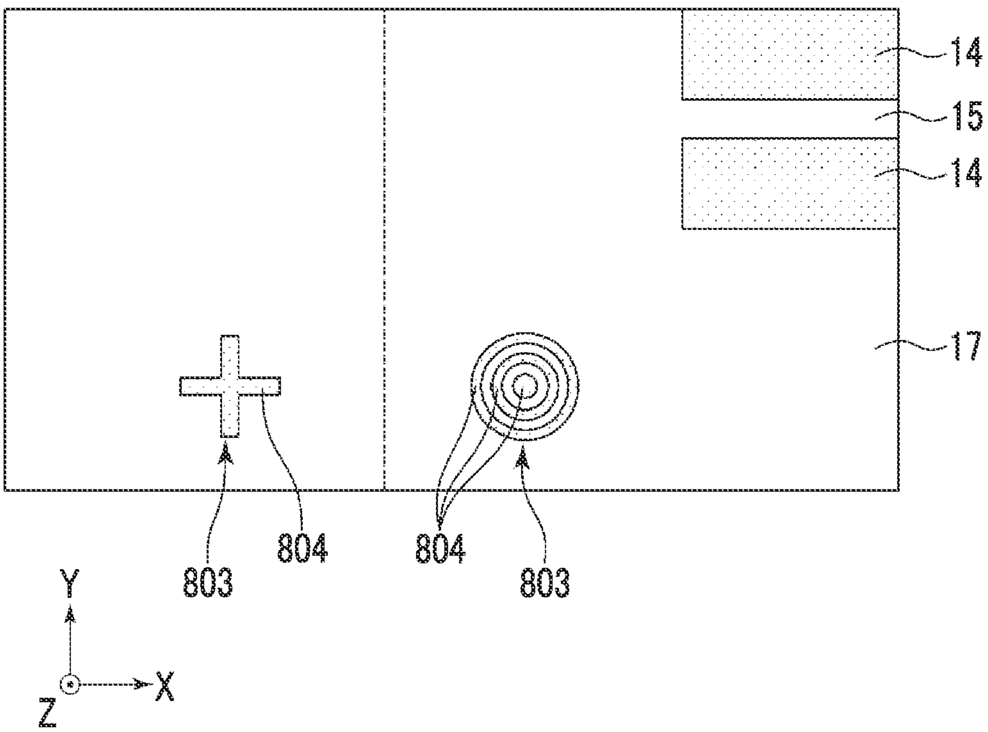
FIG. 16 is an enlarged view of a part E of FIG. 2.

FIG. 16 is an enlarged view of a part E of FIG. 2. FIG. 2 or 16 shows various examples of the mark 803.

For example, in the workpiece 100 shown in FIG. 2, a cross-shaped mark as the mark 803 is provided outside the unit 200 as shown in FIG. 16. In addition, as shown in FIG. 16, a concentric circular mark as the mark 803 is provided inside the unit 200 shown in FIG. 2. Furthermore, inside the unit 200 shown in FIG. 2 and at the center of the width of the piece 300, a circular mark as the mark 803 is provided as shown in FIG. 16.

The shape of the mark 803 is not limited to the shape shown in the drawing, and may be any shape.

The mark 803 shown in FIG. 16 has a high-refractive-index portion 804 having a refractive index higher than that of the second side cladding portion 17.

According to such a configuration, the way the mark 803 is seen in a case where the second side cladding portion 17 is used as a background, for example, the way light passes through the mark 803 can be changed. Accordingly, visibility of the mark 803 can be improved.

In addition, in the present embodiment, a constituent material of the high-refractive-index portion 804 is the same as the material of the core portion 14. As a result, it is possible to manufacture the high-refractive-index portion 804 at the same time as the core portion 14. Therefore, the mark 803 having the high-refractive-index portion 804 is easily manufactured.

Furthermore, the high-refractive-index portion 804 can be formed according to the non-irradiated region 302 with the active radiation R. On the other hand, the core portion 14 is also formed to correspond to the non-irradiated region 302 with the active radiation R. Therefore, a position accuracy of the mark 803 with respect to the core portion 14 is the same as the position accuracy of the non-irradiated region 302, and is very high.

In addition, the number and arrangement of the units 200 and the pieces 300 in the workpiece 100 shown in FIG. 1 are not limited thereto.

The manufacturing method of an optical waveguide according to the present invention has been described above based on the embodiments shown in the drawings, but the present invention is not limited thereto.

For example, the manufacturing method of an optical waveguide according to the present invention may include a step for any purpose in the above-described embodiments.

EXAMPLES

Next, specific examples of the present invention will be described.

5. PRODUCTION OF POST-EXPOSURE LAMINATE 5.1. Synthesis of Polymer

Hexylnorbornene (HxNB, 7.2 g, 40.1 mmol) and diphenylmethylnorbornene methoxysilane (diPhNB, 12.9 g, 40.1 mmol) were weighed in a 500 mL vial in a dry box. Thereafter, 60 g of dehydrated toluene and 11 g of ethyl acetate were added to the 500 mL vial, and the upper part was sealed with a silicone sealer.

Next, 1.56 g (3.2 mmol) of an Ni catalyst and 10 mL of dehydrated toluene were weighed in a 100 mL vial, a stirrer bar was inserted, the vial bottle was sealed, and the catalyst was sufficiently stirred and completely dissolved. 1 mL of the Ni catalyst solution was accurately measured with a syringe, injected into the vial in which the above-described two kinds of norbornene were dissolved, and stirred at room temperature for 1 hour. As a result, a significant increase in viscosity was confirmed. At this point, the stopper was removed, 60 g of tetrahydrofuran (THF) was added thereto, and the mixture was stirred to obtain a reaction solution.

Next, 9.5 g of glacial acetic acid, 18 g (concentration: 30%) of hydrogen peroxide water, and 30 g of ion exchange water were added to a 100 ml beaker and stirred to prepare a peracetic acid aqueous solution. Next, the total amount of the aqueous solution was added to the above-described reaction solution and stirred for 12 hours to perform a reduction treatment of Ni.

Next, the reaction solution in which the treatment had been completed was transferred to a separatory funnel, the water layer in the lower part was removed, and then 100 mL of a 30% aqueous solution of isopropyl alcohol was added thereto and vigorously stirred. After the mixture was left to stand and two layers were completely separated, the water layer was removed. After repeating the water-washing process a total of three times, the oil layer was added dropwise to a large excess of acetone, and the generated polymer was re-precipitated and separated from the filtrate by filtration. Thereafter, the precipitate was heated and dried in a vacuum dryer set at 60° C. for 12 hours to obtain a polymer.

As a result of identification of the obtained polymer by NMR measurement, a molar ratio of each structural unit in the polymer was 50 mol % of a hexylnorbornene structural unit and 50 mol % of a diphenylmethylnorbornenemethoxysilane structural unit.

5.2. Preparation of Resin Composition for Forming Core 10 g of the above-described polymer was weighed in a 100 mL glass container, and then 40 g of mesitylene, an antioxidant Irganox 1076 (manufactured by BASF, 0.01 g), a cyclohexyloxetane monomer (manufactured by Toagosei Co., Ltd., CHOX, 2 g), and a polymerization initiator (photoacid generator) Rhodorsil (registered trademark) Photoinitiator 2074 (manufactured by Rhodia Inc., 0.0125 g, in 0.1 mL of ethyl acetate) were added to the glass container and uniformly dissolved. Thereafter, the obtained solution was filtered through a 0.2 μm PTFE filter to prepare a varnish-like resin composition for forming core.

5.3. Production of Core Forming Layer

The resin composition for forming core was uniformly applied onto a substrate (PET film) having a thickness of 100 μm and forming a square having one side of 50 mm, which had been subjected to a release treatment, and then introduced into a dryer at 40° C. for 5 minutes. The solvent was completely removed to form a film. As a result, a core film (pre-exposure laminate) having a core forming layer having a film thickness of 40 μm was obtained.

5.4. Exposure Treatment 5.4.1. Exposure Treatment with Changed Area Ratio of Irradiated Region The core film was irradiated with ultraviolet rays by a direct drawing exposure machine. An integrated light amount of the ultraviolet rays was set to 1300 $mJ/cm^2$. Thereafter, the core film was placed in an oven and heated at a heating temperature of 160° C. for a heating time of 60 minutes. As a result, a core layer including a core portion corresponding to a non-irradiated region was obtained. A test piece E1 as a post-exposure laminate having a core layer and a substrate supporting the core layer was obtained.

Figure 17:
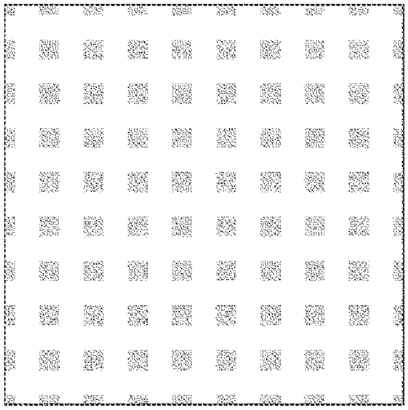
FIG. 17 is a schematic view showing a pattern of an irradiated region and a non-irradiated region with ultraviolet rays in a case where a test piece E1 is produced.
Figure 17:
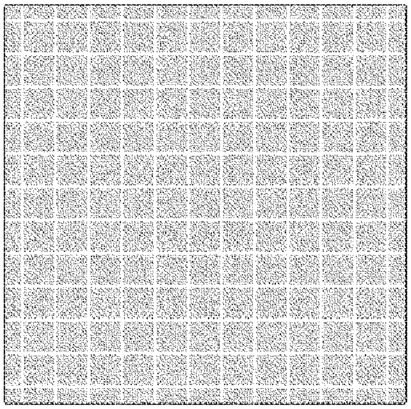

FIG. 17 is a schematic view showing a pattern of the irradiated region and the non-irradiated region with ultraviolet rays in a case where the test piece E1 was produced. In FIG. 17, a region to which dots are attached is the irradiated region, and a region to which dots are not attached is the non-irradiated region. In the production of the test piece E1, the area ratio of the irradiated region was changed to 11 stages of 5%, 10%, 20%, 30%, 40%, 50%, 60%, 70%, 80%, 90%, and 95%. FIG. 17 shows, as representative examples, a pattern with an irradiated region having an area ratio of 20% and a pattern with an irradiated region having an area ratio of 95%.

5.4.2. Exposure Treatment with Changed Position of Irradiated Region

The core film was irradiated with ultraviolet rays by a direct drawing exposure machine. Thereafter, the core film was placed in an oven and heated at a heating temperature of 160° C. for a heating time of 60 minutes. As a result, a core layer including a core portion corresponding to a non-irradiated region was obtained. Test pieces E2 and E3 as a post-exposure laminate having a core layer and a substrate supporting the core layer were obtained.

Figure 18:
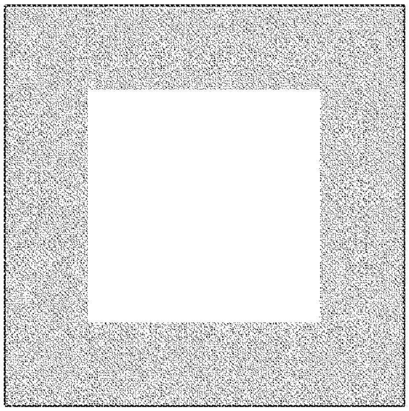
FIG. 18 is a schematic view showing a pattern of an irradiated region and a non-irradiated region with ultraviolet rays in a case where test pieces E2 and E3 are produced.
Figure 18:
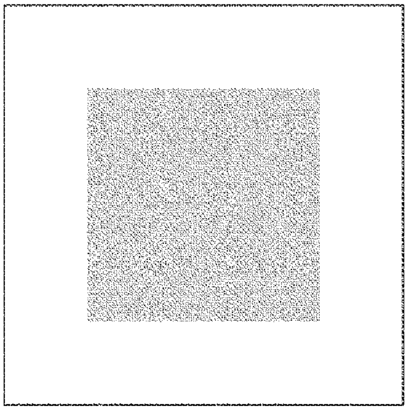

FIG. 18 is a schematic view showing a pattern of the irradiated region and the non-irradiated region with ultraviolet rays in a case where the test pieces E2 and E3 were produced. In FIG. 18, a region to which dots are attached is the irradiated region, and a region to which dots are not attached is the non-irradiated region. In the production of the test piece E2, the irradiated region with the ultraviolet rays was set in a frame-shaped part along the outer edge of the core film. On the other hand, in the production of the test piece E3, the irradiated region with the ultraviolet rays was set to a part inside the frame-shaped part. The area ratio of the irradiated region in a case where the test pieces E2 and E3 were produced was 50% in all cases.

6. EVALUATION OF TEST PIECE E1

6.1. Measurement of Magnitude of Warpage

Figure 19:
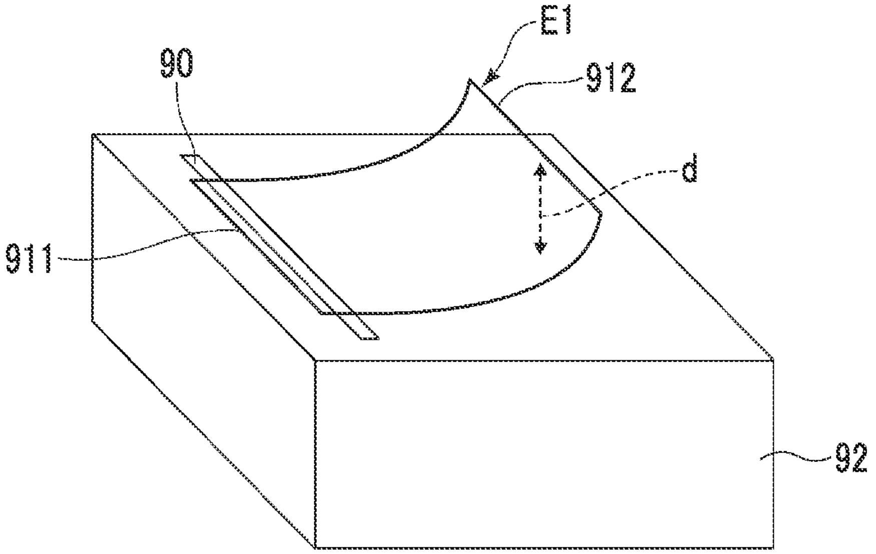
FIG. 19 is a schematic view showing a method of measuring a magnitude of warpage of the test piece E1 in which the warpage has occurred.

For each of the produced test pieces E1, the degree of deformation (warpage) was measured by the following measurement method. FIG. 19 is a schematic view showing a method of measuring the magnitude of warpage of the test piece E1 in which the warpage had occurred.

In order to measure the magnitude of warpage, as shown in FIG. 19, one side 911 of each test piece E1 was fixed to a base 92. For the fixing, for example, a pressure-sensitive adhesive tape 90 was used. In a case where the one side 911 was fixed, the opposite side 912 was lifted from the base 92 due to the influence of warpage. In this case, the maximum value of a separated distance d between the opposite side 912 and the base 92 was regarded as the magnitude of warpage of each test piece E1.

6.2. Evaluation of Magnitude of Warpage

Figure 20:
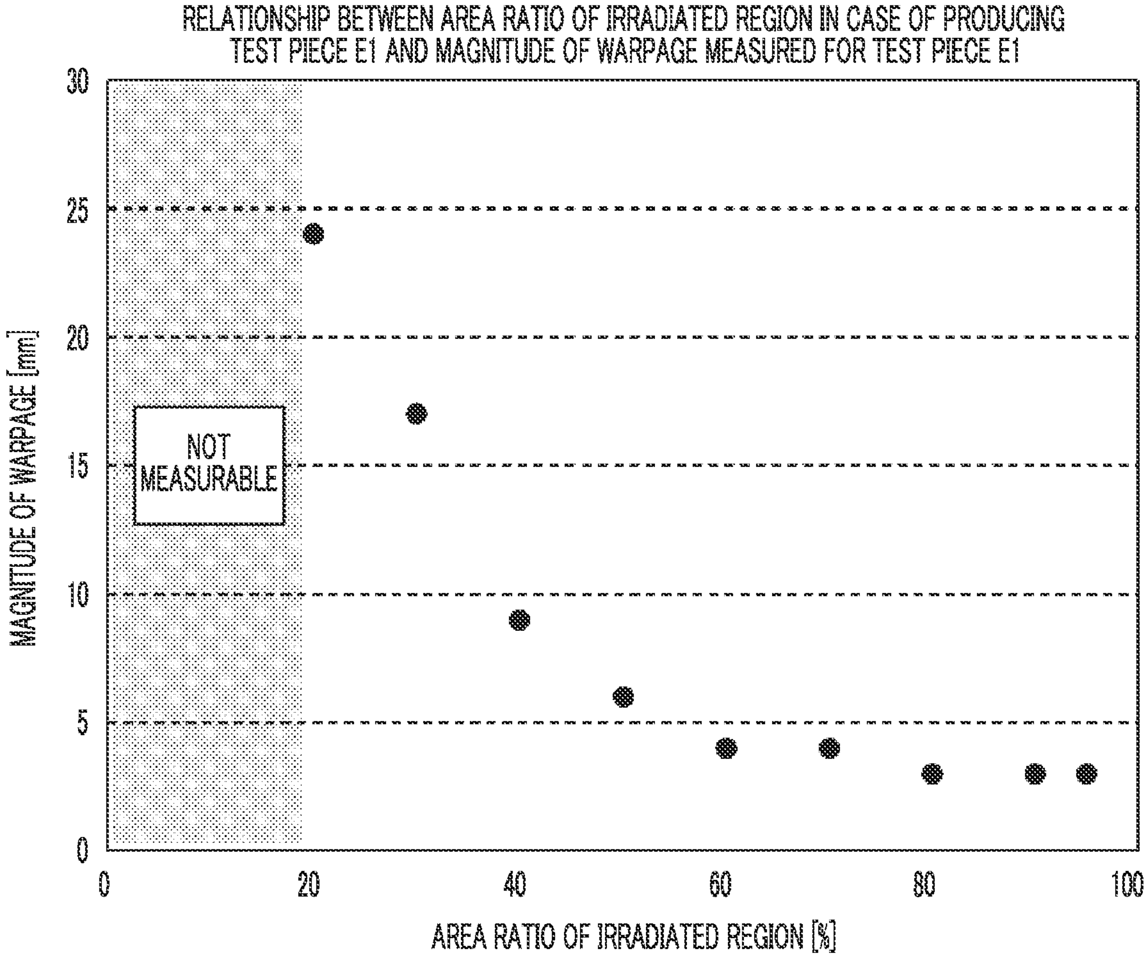
FIG. 20 is a graph showing a relationship between an area ratio of the irradiated region in a case where each test piece E1 is manufactured and the magnitude of warpage measured for each test piece E1.

The magnitude of the warpage measured in 6.1 and the area ratio of the irradiated region in the case of producing each test piece E1 were plotted in an orthogonal coordinate system. As a result, a graph shown in FIG. 20 was obtained. FIG. 20 is a graph showing a relationship between the area ratio of the irradiated region in a case where each test piece E1 was produced and the magnitude of warpage measured for each test piece E1.

As shown in FIG. 20, in a range in which the area ratio of the irradiated region was 20% or more and less than 50%, a tendency that the magnitude of warpage of the test piece E1 gradually decreased as the area ratio of the irradiated region increased was recognized. In addition, in a range in which the area ratio of the irradiated region was 50% or more, the warpage of the test piece E1 was sufficiently small and suppressed.

On the other hand, in a range in which the area ratio of the irradiated region was less than 20%, the warpage of the test piece E1 was significant, and the test piece E1 was rounded in a cylindrical shape. Therefore, the magnitude of warpage could not be measured. In addition, it was difficult to provide the round test piece E1 for lamination with the cladding film.

From the above-described evaluation results, it was recognized that, according to the present invention, the warpage of the post-exposure laminate could be suppressed by setting the area ratio of the irradiated region to be 20% or more.

7. EVALUATION OF TEST PIECES E2 AND E3

7.1. Measurement of Magnitude of Warpage

The magnitude of warpage of the test pieces E2 and E3 was measured in the same manner as in 6.1.

7.2. Evaluation of Magnitude of Warpage

The magnitude of warpage of the test piece E2 was suppressed to be smaller than that of the test piece E3. Therefore, it was recognized that the warpage of the post-exposure laminate could be suppressed by setting the irradiated region in a frame shape along the outer edge.

INDUSTRIAL APPLICABILITY

According to the present invention, an area of an irradiated region in which a side cladding portion is formed by irradiating a core forming layer with active radiation is 20% or more of the entire area of the core forming layer. A volume change of the side cladding portion in the manufacturing process is smaller than that of the core portion. Therefore, in a post-exposure laminate obtained by irradiating the core forming layer with active radiation, by manufacturing the workpiece such that the proportion of the area occupied by the side cladding portion with respect to the entire area of the core layer, that is, the area ratio of the side cladding portion is within the above-described range, deformation such as warpage in the post-exposure laminate is suppressed, and the optical waveguide can be efficiently manufactured. Accordingly, the present invention has industrial applicability.

REFERENCE SIGNS LIST

1: Optical waveguide
1X: Optical waveguide
11: First cladding layer
12: Second cladding layer
13: Core layer
13X: Core layer
14: Core portion
15: First side cladding portion
17: Second side cladding portion
18: First cover layer
19: Second cover layer
90: Pressure-sensitive adhesive tape
92: Base
100: Workpiece
100C: Workpiece
100X: Workpiece
131: Polymer
132: Monomer
160: Core forming layer
170: Clad forming layer
200: Unit
200C: Unit
300: Piece
301: Irradiated region
301F: Frame-shaped part
302: Non-irradiated region
303: Photomask
304: Direct drawing exposure machine
500: Substrate
600: Core film
650: Post-exposure laminate
650X: Post-exposure laminate
660: First laminate
670: Second laminate
701: Cladding film
702: Cladding film
803: Mark
804: High-refractive-index portion
911: One side
912: Opposite side
CL: Cutting line
DB: Dicing blade E1: Test piece
E2: Test piece
E3: Test piece
R: Active radiation
S102: Member preparation step
S104: Core layer formation step
S106: Cladding layer formation step
S108: Cutting step
d: Separated distance

What is claimed is:

1. A manufacturing method of an optical waveguide, comprising:

a step of preparing a pre-exposure laminate including a substrate and a core forming layer laminated on the substrate;

a step of irradiating the core forming layer with active radiation to obtain a post-exposure laminate which has a core layer including a core portion corresponding to a non-irradiated region with the active radiation and a side cladding portion corresponding to an irradiated region with the active radiation, and has the substrate supporting the core layer;

a step of laminating a cladding layer on the core layer included in the post-exposure laminate to obtain a workpiece; and a step of cutting out an optical waveguide from the workpiece, wherein a frame-shaped part extending along an outer edge of the core forming layer and having a frame shape is provided, the frame-shaped part includes at least a portion of the irradiated region, a mark is provided within the frame-shaped part as a localized non-irradiated portion, the mark is spatially separated from the core portion, an area of the irradiated region in the pre-exposure laminate is 50% or more of an entire area of the core forming layer, and an area of the frame-shaped part in the post-exposure laminate is 70% or more of the irradiated region.

2. The manufacturing method of an optical waveguide according to claim 1, wherein the core forming layer contains a polymer and a monomer, and the monomer moves by the irradiation with active radiation to cause a difference in refractive index between the irradiated region and the non-irradiated region.

3. The manufacturing method of an optical waveguide according to claim 2, wherein a film thickness of the cladding layer is 1 to 200 μm.

4. The manufacturing method of an optical waveguide according to claim 2, wherein the workpiece includes the core layer and two cladding layers laminated through the core layer, and the step of obtaining the workpiece includes an operation of laminating the cladding layer on the core layer included in the post-exposure laminate to obtain a first laminate, an operation of peeling off the substrate from the first laminate to obtain a remainder as a second laminate, and an operation of laminating the cladding layer on the core layer included in the second laminate to obtain the workpiece.

5. The manufacturing method of an optical waveguide according to claim 2, wherein a total film thickness of the workpiece is 50 to 300 μm.

6. The manufacturing method of an optical waveguide according to claim 1, wherein a film thickness of the cladding layer is 1 to 200 μm.

7. The manufacturing method of an optical waveguide according to claim 1, wherein the workpiece includes the core layer and two cladding layers laminated through the core layer, and the step of obtaining the workpiece includes an operation of laminating the cladding layer on the core layer included in the post-exposure laminate to obtain a first laminate, an operation of peeling off the substrate from the first laminate to obtain a remainder as a second laminate, and an operation of laminating the cladding layer on the core layer included in the second laminate to obtain the workpiece.

8. The manufacturing method of an optical waveguide according to claim 7, wherein the workpiece further includes a first cover layer and a second cover layer laminated to sandwich the core layer and the two cladding layers.

9. The manufacturing method of an optical waveguide according to claim 1, wherein a total film thickness of the workpiece is 50 to 300 μm.

* * * * *